US010911285B2

(12) United States Patent
Liu

(10) Patent No.: US 10,911,285 B2
(45) Date of Patent: Feb. 2, 2021

(54) APPARATUS AND METHOD FOR PROCESSING RADIO SIGNAL CONFIGURATIONS IN DIFFERENT SUBCARRIER SPACING

(71) Applicant: HUAWEI TECHNOLOGIES CO., LTD., Guangdong (CN)

(72) Inventor: Kunpeng Liu, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 11 days.

(21) Appl. No.: 16/270,308

(22) Filed: Feb. 7, 2019

(65) Prior Publication Data
US 2019/0190761 A1 Jun. 20, 2019

Related U.S. Application Data

(63) Continuation of application No. PCT/CN2017/097261, filed on Aug. 11, 2017.

(30) Foreign Application Priority Data

Aug. 12, 2016 (CN) .......................... 2016 1 0666792

(51) Int. Cl.
*H04W 4/00* (2018.01)
*H04L 27/26* (2006.01)
(Continued)

(52) U.S. Cl.
CPC ............ *H04L 27/2626* (2013.01); *H04L 1/00* (2013.01); *H04L 5/0007* (2013.01);
(Continued)

(58) Field of Classification Search
CPC ....... H04L 1/00; H04L 5/0007; H04L 5/0044; H04L 27/2602; H04L 27/26; H04L 1/18; H04L 5/00
See application file for complete search history.

(56) References Cited

U.S. PATENT DOCUMENTS

2009/0067534 A1* 3/2009 Kwak ................. H04B 7/0413
375/267
2011/0103494 A1 5/2011 Ahmadi
(Continued)

FOREIGN PATENT DOCUMENTS

CN 101150553 A 3/2008
CN 101572683 A 11/2009
(Continued)

OTHER PUBLICATIONS

International Search Report issued Nov. 7, 2017 in corresponding to International Application No. PCT/CN2017/097261.
(Continued)

*Primary Examiner* — Abdelnabi O Musa
(74) *Attorney, Agent, or Firm* — Leydig, Voit & Mayer, Ltd.

(57) ABSTRACT

This application relates to the field of wireless communications technologies, and discloses a signal sending method. The method includes: mapping, onto a time frequency resource, a first signal that is in frequency domain and that corresponds to a subcarrier spacing parameter in a subcarrier spacing system parameter group, and generating a second signal that is in time domain and that corresponds to the first signal; and sending the second signal to a second network device. First signals corresponding to the different subcarrier spacing system parameters occupy a same quantity of subcarriers, and second signals corresponding to the different subcarrier spacing system parameters occupy a same time length T.

20 Claims, 7 Drawing Sheets

(51) Int. Cl.
    *H04L 1/00*        (2006.01)
    *H04L 5/00*        (2006.01)

(52) U.S. Cl.
    CPC .......... *H04L 5/0044* (2013.01); *H04L 5/0094* (2013.01); *H04L 27/2602* (2013.01); *H04L 27/2605* (2013.01)

(56) References Cited

U.S. PATENT DOCUMENTS

| | | | | |
|---|---|---|---|---|
| 2019/0013982 A1* | 1/2019 | Sun | ........................ | H04W 76/27 |
| 2019/0150132 A1* | 5/2019 | Bala | .................... | H04W 72/042 |
| | | | | 370/329 |

FOREIGN PATENT DOCUMENTS

| | | | |
|---|---|---|---|
| CN | 101836385 | A | 9/2010 |
| CN | 103428143 | A | 12/2013 |
| CN | 103581072 | A | 2/2014 |
| CN | 103856308 | | 6/2014 |
| WO | 2015131827 | A1 | 9/2015 |

OTHER PUBLICATIONS

Nokia, et al. "Comparison of different subcarrier scaling principles" R1-165025, 3GPP Tsg-Ran WG1 Meeting #85, Nanjing, P. R. China 23rd — 27th May 2016, total 3 pp. 111.

International Search Report dated Nov. 7, 2017 in corresponding International Patent Application No. PCT/CN2017/097261 (7 pp.).

Written Opinion of the International Searching Authority dated Nov. 7, 2017 in corresponding International Patent Application No. PCT/CN2017/097261 (4 pp.).

\* cited by examiner

APPARATUS AND METHOD FOR PROCESSING RADIO SIGNAL CONFIGURATIONS IN DIFFERENT SUBCARRIER SPACING

CROSS-REFERENCE TO RELATED APPLICATIONS

This application is a continuation of International Application No. PCT/CN2017/097261, filed on Aug. 11, 2017, which claims priority to Chinese Patent Application No. 201610666792.5, filed on Aug. 12, 2016. The disclosures of the aforementioned applications are hereby incorporated by reference in their entireties.

TECHNICAL FIELD

This application relates to the field of wireless communications technologies, and in particular, to a signal sending apparatus and method, and a signal detection apparatus and method.

BACKGROUND

With continuous development of wireless communications technologies, how to enable a wireless system to apply to different wireless application scenarios, such as an enhanced mobile broadband scenario, a massive machine type communication scenario, and an ultra reliable low-latency scenario, is one of important researches in the industry.

In the prior art, to select a subcarrier spacing system parameter (numerology), impact of spectrum efficiency and anti-frequency-offset performance needs to be considered. Different wireless application scenarios have different requirements for the spectrum efficiency and the anti-frequency-offset performance. Therefore, the wireless system needs to support a plurality of different subcarrier spacings. In addition, different subcarrier spacings are used to send and receive radio signals in different application scenarios, and signal configurations such as symbol lengths corresponding to the different subcarrier spacings are also different.

In a process of implementing this application, the inventor finds that the following problems exist:

Before accessing a wireless system supporting a plurality of subcarrier spacings, a terminal does not know a current subcarrier spacing configuration in the system. Therefore, when initiating access to the wireless system, the terminal needs to consider impact of different signal configurations in a case of different subcarrier spacings on an access process, causing a relatively complex access process and affecting communication efficiency.

SUMMARY

To resolve problems in the prior art that when initiating access to a wireless system, a terminal needs to consider impact of different signal configurations in a case of different subcarrier spacings on an access process, causing a relatively complex access process and affecting communication efficiency, this application provides a signal sending apparatus and method, and a signal detection apparatus and method.

According to a first aspect, this application provides a signal sending method. The method includes: mapping, by a first network device onto a time frequency resource, a first signal that is in frequency domain and that corresponds to a subcarrier spacing parameter in a subcarrier spacing system parameter group $\{\Delta_i\}$, $0<i\leq I$, and generating a second signal that is in time domain and that corresponds to the first signal, where the second signal is an orthogonal frequency division multiplexing (OFDM) symbol in time domain, the OFDM symbol includes an effective OFDM symbol and a cyclic prefix of the effective OFDM symbol, D is a quantity of subcarrier spacing system parameters in the subcarrier spacing system parameter group $\{\Delta_i\}$, $0<i\leq I$, D is an integer greater than or equal to 2, any two subcarrier spacing system parameters in the subcarrier spacing system parameter group $\{\Delta_i\}$, $0<i\leq I$ satisfy a multiple relationship of $2^c$, and c is an integer greater than 1; and sending, by the first network device, the second signal to a second network device, where first signals and second signals respectively corresponding to different subcarrier spacing system parameters in the subcarrier spacing system parameter group $\{A\}$, $0<i\leq I$ have the following characteristics:

the first signals corresponding to the different subcarrier spacing system parameters occupy a same quantity of subcarriers; and the second signals corresponding to the different subcarrier spacing system parameters occupy a same time length T.

According to the foregoing signal sending method, when a signal is sent, at a same moment, specified signals sent based on different subcarrier spacing system parameters occupy a same quantity of subcarriers in frequency domain and occupy a same time length in time domain. When the second network device receives the signal, regardless of which type of subcarrier spacing system parameter that the first network device uses to send the signal, the specified signals included in the signal received by the second network device occupy the same quantity of subcarriers in frequency domain and occupy the same time length in time domain. In this way, when the second network device detects a specified signal in the signal sent by the first network device, impact of the quantity of subcarriers and the time domain length corresponding to the different subcarrier spacing system parameters may be ignored, thereby simplifying complexity of detecting the specified signal by the second network device, and improving communication efficiency of a wireless system.

Optionally, any two adjacent frequency domain resources mapped within a same OFDM symbol from a first signal corresponding to any subcarrier spacing system parameter $\Delta_i$ in the subcarrier spacing system parameter group $\{\Delta_i\}$, $0<i\leq I$ have a same frequency domain spacing $\Delta f$; and the first signals corresponding to the different subcarrier spacing system parameters correspond to same $\Delta f$.

Optionally, $\Delta f$ is equal to $\max(\Delta_i)$, and $\max(\Delta_i)$ is a maximum subcarrier spacing system parameter in the subcarrier spacing system parameter group $\{\Delta_i\}$, $0<i\leq I$.

Optionally, a frequency domain spacing between any two adjacent frequency domain resources mapped within a same OFDM symbol from a first signal corresponding to any subcarrier spacing system parameter in the subcarrier spacing system parameter group $\{\Delta_i\}$, $0<i\leq I$ corresponds to a same quantity $M_{\Delta_i}$ of subcarriers; and $$M_{\Delta_i} = \frac{\max(\Delta_i)}{\Delta_i},$$

where max($\Delta_i$) is a maximum subcarrier spacing system parameter in the subcarrier spacing system parameter group $\{\Delta_i\}$, $0<i\leq I$.

Optionally, data mapped on $M_{\Delta_i}-1$ subcarriers spaced by the adjacent frequency domain resources mapped within the same OFDM symbol from the first signal corresponding to any subcarrier spacing system parameter $\Delta_i$ in the subcarrier spacing system parameter group $\{\Delta_i\}$, $0<i\leq I$ is 0.

Optionally, an index of a subcarrier mapped within the same OFDM symbol from the first signal corresponding to any subcarrier spacing system parameter $\Delta_i$ in the subcarrier spacing system parameter group $\{\Delta_i\}$, $0<i\leq I$ satisfies $M_{\Delta_i}*k$, where k is an integer.

Optionally, a first signal or a second signal corresponding to any subcarrier spacing system parameter $\Delta_i$ in the subcarrier spacing system parameter group $\{\Delta_i\}$, $0<i\leq I$ includes $N_{\Delta_i}$ consecutive OFDM symbols; and $$N_{\Delta_i} = \frac{\Delta_i}{\min(\Delta_i)},$$

where min($\Delta_i$) is a minimum subcarrier spacing system parameter in the subcarrier spacing system parameter group $\{\Delta_i\}$, $0<i\leq I$.

Optionally, signal sequences respectively mapped within one OFDM symbol from the first signals corresponding to the different subcarrier spacing system parameters in the subcarrier spacing system parameter group $\{\Delta_i\}$, $0<i\leq I$ are exactly the same; or signal sequences respectively mapped within one OFDM symbol from the first signals corresponding to the different subcarrier spacing system parameters in the subcarrier spacing system parameter group $\{\Delta_i\}$, $0<i\leq I$ differ by one phase.

Optionally, $N_{\Delta_i}$ sequences mapped within the $N_{\Delta_i}$ OFDM symbols occupied by the first signal corresponding to any subcarrier spacing system parameter $\Delta_i$ in the subcarrier spacing system parameter group $\{\Delta_i\}$, $0<i\leq I$ differ by one phase.

Optionally, a phase difference between the $N_{\Delta_i}$ sequences mapped within the $N_{\Delta_i}$ OFDM symbols occupied by the first signal corresponding to the subcarrier spacing system parameter $\Delta_i$ is related to a length of a cyclic prefix CP corresponding to the subcarrier spacing system parameter $\Delta_i$.

Optionally, when signal sequences respectively mapped within one OFDM symbol from first signals corresponding to a subcarrier spacing system parameter $\Delta_i$ and a subcarrier spacing system parameter $\Delta_j$ in the subcarrier spacing system parameter group $\{\Delta_i\}$, $0<i\leq I$ differ by one phase, the following condition is satisfied:

$S_{\Delta_i}(n)=S_{\Delta_j}(n)e^{j\varphi k(n)}, 0\leq n\leq L$, where

L is a sequence length of the first signal corresponding to any subcarrier spacing system parameter in the subcarrier spacing system parameter group $\{\Delta_i\}$, $0<i\leq I$, $\varphi$ is a phase difference between the signal sequences respectively mapped within one OFDM symbol from the first signals corresponding to the subcarrier spacing system parameter $\Delta_i$ and the subcarrier spacing system parameter $\Delta_j$, $S_{\Delta_i}(n)$ and $S_{\Delta_j}(n)$ are respectively the sequences of the first signals for the subcarrier spacing system parameter $\Delta_i$ and the subcarrier spacing system parameter $\Delta_j$ within the OFDM symbol, and k(n) is a frequency of a subcarrier occupied by the $n^{th}$ sequence symbol in $S_{\Delta_j}(n)$.

Optionally, a signal sequence mapped within one corresponding OFDM symbol from a first signal for a subcarrier spacing system parameter $\Delta_i$ in the subcarrier spacing system parameter group $\{\Delta_i\}$, $0<i\leq I$ and a signal sequence mapped within one corresponding OFDM symbol from a first signal corresponding to a subcarrier spacing system parameter $\Delta_j$ in the subcarrier spacing system parameter group $\{\Delta_i\}$, $0<i\leq I$ differ by one phase; and $S_{\Delta_i}^p(n)=S_{\Delta_j}^q(n)e^{j\varphi n}$, where L is a sequence length of the first signal corresponding to any subcarrier spacing system parameter in the subcarrier spacing system parameter group $\{\Delta_i\}$, $0<i\leq I$;

$S_{\Delta_i}^p(n)$ is a signal sequence mapped within the $p^{th}$ of $N_{\Delta_i}$ OFDM symbols occupied by the first signal for the subcarrier spacing system parameter $\Delta_i$;

$S_{\Delta_j}^q(n)$ is a signal sequence mapped within the $q^{th}$ of $N_{\Delta_j}$ OFDM symbols occupied by the first signal for the subcarrier spacing system parameter $\Delta_j$; and $\varphi$ is a phase difference between $S_{\Delta_i}^p(n)$ and $S_{\Delta_j}^p(n)$, and $\varphi$ is related to a length of a CP corresponding to the subcarrier spacing system parameter $\Delta_i$ and a length of a CP corresponding to the subcarrier spacing system parameter $\Delta_j$.

Optionally, $\varphi$ is related to the length of the CP corresponding to the subcarrier spacing system parameter $\Delta_i$, the length of the CP corresponding to the subcarrier spacing system parameter $\Delta_j$, p, and q.

Optionally, the subcarrier spacing system parameter $\Delta_j$ is the minimum subcarrier spacing system parameter in the subcarrier spacing system parameter group $\{\Delta_i\}$, $0<i\leq I$; and $\varphi=2\pi(N_{CP}^{\Delta_j}-\Sigma_{r=0}^{r=p}N_{CP,r}^{\Delta_i})$ or $\varphi=-2\pi(N_{CP}^{\Delta_j}-\Sigma_{r=0}^{r=p}N_{CP,r}^{\Delta_i})$, where $N_{CP}^{\Delta_j}$ is the length of the CP corresponding to the subcarrier spacing system parameter $\Delta_j$, $N_{CP,r}^{\Delta_i}$ is a length of a CP of the $r^{th}$ OFDM symbol corresponding to the subcarrier spacing system parameter $\Delta_i$, $0\leq p<N_{\Delta_i}$, and q=0.

Optionally, the phase difference $\varphi$ is related to a frequency domain location occupied by the first signal corresponding to the subcarrier spacing system parameter $\Delta_i$ and a frequency domain location occupied by the first signal corresponding to the subcarrier spacing system parameter $\Delta_j$.

Optionally, the phase difference $\varphi$ satisfies the following relationship:

$\varphi=2\pi\Delta k$ or $\varphi=-2\pi\Delta k$, where $\Delta k$ is a frequency domain spacing between frequency domain resources occupied by $S_{\Delta_i}(n)$ and $S_{\Delta_j}(n)$.

Optionally, the phase difference $\varphi$ is related to lengths of CPs respectively corresponding to the subcarrier spacing system parameter $\Delta_i$ and the subcarrier spacing system parameter $\Delta_j$ and frequency domain locations occupied by the first signals corresponding to the subcarrier spacing system parameter $\Delta_i$ and the subcarrier spacing system parameter $\Delta_j$.

Optionally, consecutive signals of the second signals respectively corresponding to the different subcarrier spacing system parameters in the subcarrier spacing system parameter group $\{\Delta_i\}$, $0<i\leq I$ within the occupied time length T are the same; or consecutive signals of the second signals respectively corresponding to the different subcarrier spacing system parameters in the subcarrier spacing system parameter group $\{\Delta_i\}$, $0<i\leq I$ within the occupied time length T differ by one cyclic shift or one phase.

Optionally, when consecutive signals of second signals respectively corresponding to a subcarrier spacing system parameter $\Delta_i$ and a subcarrier spacing system parameter $\Delta_j$ in the subcarrier spacing system parameter group $\{\Delta_i\}$, $0 < i \leq I$ within the occupied time length T differ by one phase, the following condition is satisfied:

$$Y_{\Delta_i}(t) = Y_{\Delta_j}(t)e^{j\varphi t}, \text{ where}$$

$Y_{\Delta_i}(t)$ is the consecutive signals of the second signal corresponding to the subcarrier spacing system parameter $\Delta_i$ within the occupied time length T, $Y_{\Delta_j}(t)$ is the consecutive signals of the second signal corresponding to the subcarrier spacing system parameter $\Delta_j$ within the occupied time length T, and $\varphi$ is a phase difference between $Y_{\Delta_i}(t)$ and $Y_{\Delta_j}(t)$.

Optionally, when consecutive signals of second signals respectively corresponding to a subcarrier spacing system parameter $\Delta_i$ and a subcarrier spacing system parameter $\Delta_j$ in the subcarrier spacing system parameter group $\{\Delta_i\}$, $0 < i \leq I$ within the occupied time length T differ by one cyclic shift, the following condition is satisfied:

$$Y_{\Delta_i}(t) = Y_{\Delta_j}(t+m), \text{ where}$$

$Y_{\Delta_i}(t)$ is the consecutive signals of the second signal corresponding to the subcarrier spacing system parameter $\Delta_i$ within the occupied time length T, $Y_{\Delta_j}(t+m)$ is consecutive signals obtained after cyclically shifting the second signal corresponding to the subcarrier spacing system parameter $\Delta_j$ within the occupied time length T by m.

Optionally, the consecutive signals of the second signals respectively corresponding to the different subcarrier spacing system parameters in the subcarrier spacing system parameter group $\{\Delta_i\}$, $0 < i \leq I$ within the occupied time length T are periodically repeated.

Optionally, an integer quantity of times that the consecutive signals of the second signals respectively corresponding to the different subcarrier spacing system parameters within the occupied time length T are periodically repeated is R; and $$R = \frac{\max(\Delta_i)}{\min(\Delta_i)},$$

where $\min(\Delta_i)$ is a minimum subcarrier spacing system parameter in the subcarrier spacing system parameter group $\{\Delta_i\}$, $0 < i \leq I$, and $\max(\Delta_i)$ is a maximum subcarrier spacing system parameter in the subcarrier spacing system parameter group $\{\Delta_i\}$, $0 < i \leq I$.

Optionally, a length of a minimum period within which the consecutive signals of the second signals respectively corresponding to the different subcarrier spacing system parameters within the occupied time length T are repeated is a length of an OFDM symbol corresponding to the maximum subcarrier spacing system parameter in the subcarrier spacing system parameter group $\{\Delta_i\}$, $0 < i \leq I$.

Optionally, a length of a minimum period within which the consecutive signals of the second signals respectively corresponding to the different subcarrier spacing system parameters within the occupied time length T are repeated is 1/R of a length of an OFDM symbol corresponding to the minimum subcarrier spacing system parameter in the subcarrier spacing system parameter group $\{\Delta_i\}$, $0 < i \leq I$.

Optionally, a quantity of times that the second signal corresponding to the subcarrier spacing system parameter $\Delta_i$ in the subcarrier spacing system parameter group $\{\Delta_i\}$, $0 < i \leq I$ is repeated within one OFDM symbol is $M_{\Delta_i}$; and $$M_{\Delta_i} = \frac{\max(\Delta_i)}{\Delta_i},$$

where $\max(\Delta_i)$ is the maximum subcarrier spacing system parameter in the subcarrier spacing system parameter group $\{\Delta_i\}$, $0 < i \leq I$.

Optionally, second signals respectively corresponding to the $N_{\Delta_i}$ OFDM symbols occupied by the first signal corresponding to the subcarrier spacing system parameter $\Delta_i$ in the subcarrier spacing system parameter group $\{\Delta_i\}$, $0 < i \leq I$ differ by one cyclic shift.

Optionally, $N_{\Delta_i}$ effective OFDM symbols included in the second signal corresponding to the subcarrier spacing system parameter $\Delta_i$ in the subcarrier spacing system parameter group $\{\Delta_i\}$, $0 < i \leq I$ satisfy the following condition:

$$Z_{\Delta_i}^P(n) = Z_{\Delta_j}^P(n + m_{\Delta_i}^P), 0 \leq n < L; \text{ and}$$

$$m_{\Delta_i}^P = N_{CP}^{\Delta_j} - \Sigma_{r=0}^{r=p} N_{CP,r}^{\Delta_i} \text{ or } m_{\Delta_i}^P = -(N_{CP}^{\Delta_j} - \Sigma_{r=0}^{r=p} N_{CP,r}^{\Delta_i}), \text{ where}$$

$Z_{\Delta_i}^P(n)$ is consecutive signals within the $p^{th}$ period that uses an effective symbol length of $\Delta_i$ as the minimum period and that are in the second signal corresponding to the subcarrier spacing system parameter $\Delta_i$, and $0 \leq p < N_{\Delta_i}$.

$Z_{\Delta_j}^P(n)$ is consecutive signals within the $p^{th}$ period that correspond to the effective OFDM symbols and that are in the second signal corresponding to the subcarrier spacing system parameter $\Delta_j$ in the subcarrier spacing system parameter group $\{\Delta_i\}$, $0 < i \leq I$;

$N_{CP}^{\Delta_j}$ is the length of the CP corresponding to the subcarrier spacing system parameter $\Delta_j$; and $N_{CP,r}^{\Delta_i}$ is a length of a CP of the $r^{th}$ OFDM symbol corresponding to the subcarrier spacing system parameter $\Delta_i$.

Optionally, the first signal or the second signal corresponds to at least one of a downlink synchronization signal, a downlink measurement pilot reference signal, an uplink random access channel RACH signal, and an uplink channel sounding reference signal SRS, where the downlink synchronization signal includes a primary synchronization signal, or the downlink synchronization signal includes a primary synchronization signal and a secondary synchronization signal.

Optionally, the subcarrier spacing system parameter group $\{\Delta_i\}$, $0 < i \leq I$ includes some or all of subcarrier spacing system parameters supported by a system.

Optionally, the subcarrier spacing system parameter group $\{\Delta_i\}$, $0 < i \leq I$ is.

any one of {15 kHz, 30 kHz}, {60 kHz, 120 kHz}, {240 kHz, 480 kHz}, {15 kHz, 30 kHz, 60 kHz}, {120 kHz, 240 kHz, 480 kHz}, or {15 kHz, 30 kHz, 60 kHz, 120 kHz, 240 kHz, 480 kHz}.

Optionally, signals corresponding to the different subcarrier spacing system parameters included in the subcarrier spacing system parameter group $\{\Delta_i\}$, $0 < i \leq I$ are transmitted in a time division multiplexing or frequency division multiplexing manner.

Optionally, a frequency division multiplexing manner is used for the first signal and a data channel that correspond to the subcarrier spacing system parameter $\Delta_i$ in the subcarrier spacing system parameter group $\{\Delta_i\}$, $0 < i \leq I$, and an OFDM symbol corresponding to data carried in the data channel is generated based on the subcarrier spacing system parameter $\Delta_i$.

Optionally, the first network device is a wireless access device and the second network device is a terminal, or the first network device is a terminal and the second network device is a wireless access device.

According to a second aspect, this application provides a signal detection method. The method includes:

mapping, by a second network device onto a time frequency resource, a first signal that is in frequency domain and that corresponds to a subcarrier spacing parameter in a subcarrier spacing system parameter group $\{\Delta_i\}$, $0<i\leq I$, and generating a second signal that is in time domain and that corresponds to the first signal, where the second signal is an OFDM symbol in time domain, the OFDM symbol includes an effective OFDM symbol and a cyclic prefix of the effective OFDM symbol, I is a quantity of subcarrier spacing system parameters in the subcarrier spacing system parameter group $\{\Delta_i\}$, $0<i\leq I$, I is an integer greater than or equal to 2, any two subcarrier spacing system parameters in the subcarrier spacing system parameter group $\{\Delta_i\}$, $0<i\leq I$ satisfy a multiple relationship of $2^c$, and c is an integer greater than 1;

receiving, by the second network device, a signal sent by a first network device; and detecting, by the second network device, the second signal in the received signal, where first signals and second signals respectively corresponding to different subcarrier spacing system parameters in the subcarrier spacing system parameter group $\{\Delta_i\}$, $0<i\leq I$ have the following characteristics:

the first signals corresponding to the different subcarrier spacing system parameters occupy a same quantity of subcarriers; and the second signals corresponding to the different subcarrier spacing system parameters occupy a same time length T.

Optionally, any two adjacent frequency domain resources mapped within a same OFDM symbol from a first signal corresponding to any subcarrier spacing system parameter $\Delta_i$ in the subcarrier spacing system parameter group $\{\Delta_i\}$, $0<i\leq I$ have a same frequency domain spacing $\Delta f$; and the first signals corresponding to the different subcarrier spacing system parameters correspond to same $\Delta f$.

Optionally, $\Delta f$ is equal to max($\Delta_i$), and max($\Delta_i$) is a maximum subcarrier spacing system parameter in the subcarrier spacing system parameter group $\{\Delta_i\}$, $0<i\leq I$.

Optionally, a frequency domain spacing between any two adjacent frequency domain resources mapped within a same OFDM symbol from a first signal corresponding to any subcarrier spacing system parameter $\Delta_i$ in the subcarrier spacing system parameter group $\{\Delta_i\}$, $0<i\leq I$ corresponds to a same quantity $M_{\Delta_i}$ of subcarriers; and $$M_{\Delta_i} = \frac{\max(\Delta_i)}{\Delta_i},$$

where max($\Delta_i$) is a maximum subcarrier spacing system parameter in the subcarrier spacing system parameter group $\{\Delta_i\}$, $0<i\leq I$.

Optionally, data mapped on $M_{\Delta_i}-1$ subcarriers spaced by the adjacent frequency domain resources mapped within the same OFDM symbol from the first signal corresponding to any subcarrier spacing system parameter $\Delta_i$ in the subcarrier spacing system parameter group $\{\Delta_i\}$, $0<i\leq I$ is 0.

Optionally, an index of a subcarrier mapped within the same OFDM symbol from the first signal corresponding to any subcarrier spacing system parameter $\Delta_i$ in the subcarrier spacing system parameter group $\{\Delta_i\}$, $0<i\leq I$ satisfies $M_{\Delta_i}*k$, where k is an integer.

Optionally, a first signal or a second signal corresponding to any subcarrier spacing system parameter $\Delta_i$ in the subcarrier spacing system parameter group $\{\Delta_i\}$, $0<i\leq I$ includes $N_{\Delta_i}$ consecutive OFDM symbols; and $$N_{\Delta_i} = \frac{\Delta_i}{\min(\Delta_i)},$$

where min($\Delta_i$) is a minimum subcarrier spacing system parameter in the subcarrier spacing system parameter group $\{\Delta_i\}$, $0<i\leq I$.

Optionally, signal sequences respectively mapped within one OFDM symbol from the first signals corresponding to the different subcarrier spacing system parameters in the subcarrier spacing system parameter group $\{\Delta_i\}$, $0<i\leq I$ are exactly the same; or signal sequences respectively mapped within one OFDM symbol from the first signals corresponding to the different subcarrier spacing system parameters in the subcarrier spacing system parameter group $\{\Delta_i\}$, $0<i\leq I$ differ by one phase.

Optionally, $N_{\Delta_i}$ sequences mapped within the $N_{\Delta_i}$ OFDM symbols occupied by the first signal corresponding to any subcarrier spacing system parameter $\Delta_i$ in the subcarrier spacing system parameter group $\{\Delta_i\}$, $0<i\leq I$ differ by one phase.

Optionally, a phase difference between the $N_{\Delta_i}$ sequences mapped within the $N_{\Delta_i}$ OFDM symbols occupied by the first signal corresponding to the subcarrier spacing system parameter $\Delta_i$ is related to a length of a cyclic prefix CP corresponding to the subcarrier spacing system parameter $\Delta_i$.

Optionally, when signal sequences respectively mapped within one OFDM symbol from first signals corresponding to a subcarrier spacing system parameter $\Delta_i$ and a subcarrier spacing system parameter $\Delta_j$ in the subcarrier spacing system parameter group $\{\Delta_i\}$, $0<i\leq I$ differ by one phase, the following condition is satisfied:

$$S_{\Delta_i}(n)=S_{\Delta_j}(n)e^{j\varphi k(n)}, 0\leq n\leq L, \text{ where}$$

L is a sequence length of the first signal corresponding to any subcarrier spacing system parameter in the subcarrier spacing system parameter group $\{\Delta_i\}$, $0<i\leq I$, $\varphi$ is a phase difference between the signal sequences respectively mapped within one OFDM symbol from the first signals corresponding to the subcarrier spacing system parameter $\Delta_i$ and the subcarrier spacing system parameter $\Delta_j$, $S_{\Delta_i}(n)$ and $S_{\Delta_j}(n)$ are respectively the sequences of the first signals for the subcarrier spacing system parameter $\Delta_i$ and the subcarrier spacing system parameter $\Delta_j$ within the OFDM symbol, and k (n) is a frequency of a subcarrier occupied by the $n^{th}$ sequence symbol in $S_{\Delta_j}(n)$.

Optionally, a signal sequence mapped within one corresponding OFDM symbol from a first signal for a subcarrier spacing system parameter $\Delta_i$ in the subcarrier spacing system parameter group $\{\Delta_i\}$, $0<i\leq I$ and a signal sequence mapped within one corresponding OFDM symbol from a first signal corresponding to a subcarrier spacing system parameter $\Delta_j$ in the subcarrier spacing system parameter group $\{\Delta_i\}$, $0<i\leq I$ differ by one phase; and $$S_{\Delta_i}^p(n)=S_{\Delta_j}^q(n)e^{j\varphi k(n)}, 0\leq n<L, \text{ where}$$

L is a sequence length of the first signal corresponding to any subcarrier spacing system parameter in the subcarrier spacing system parameter group $\{\Delta_i\}$, $0<i\leq I$;

$S_{\Delta_i}^P(n)$ is a signal sequence mapped within the $p^{th}$ of $N_{\Delta_i}$ OFDM symbols occupied by the first signal for the subcarrier spacing system parameter $\Delta_i$;

$S_{\Delta_j}^q(n)$ is a signal sequence mapped within the $q^{th}$ of $N_{\Delta_j}$ OFDM symbols occupied by the first signal for the subcarrier spacing system parameter $\Delta_j$, and k(n) is a frequency of a subcarrier occupied by the $n^{th}$ sequence symbol in $S_{\Delta_i}$; and $\varphi$ is a phase difference between $S_{\Delta_i}^P(n)$ and $S_{\Delta_j}^q(n)$, and $\varphi$ is related to a length of a CP corresponding to the subcarrier spacing system parameter $\Delta_i$ and a length of a CP corresponding to the subcarrier spacing system parameter $\Delta_j$.

Optionally, $\varphi$ is related to the length of the CP corresponding to the subcarrier spacing system parameter $\Delta_i$, the length of the CP corresponding to the subcarrier spacing system parameter $\Delta_j$, p, and q.

Optionally, the subcarrier spacing system parameter $\Delta_j$ is the minimum subcarrier spacing system parameter in the subcarrier spacing system parameter group $\{\Delta_i\}$, $0<i\leq I$; and $$\varphi=2\pi(N_{CP}^{\Delta_j}-\Sigma_{r=0}^{r=p}N_{CP,r}^{\Delta_i}) \text{ or } \varphi=-2\pi(N_{CP}^{\Delta_j}-\Sigma_{r=0}^{r=p}N_{CP,r}^{\Delta_i}), \text{ where}$$

$N_{CP}^{\Delta_j}$ is the length of the CP corresponding to the subcarrier spacing system parameter $\Delta_j$, $N_{CP,r}^{\Delta_i}$ is a length of a CP of the $r^{th}$ OFDM symbol corresponding to the subcarrier spacing system parameter $\Delta_i$, $0\leq p<N_{\Delta_i}$ and q=0.

Optionally, the phase difference $\varphi$ is related to a frequency domain location occupied by the first signal corresponding to the subcarrier spacing system parameter $\Delta_i$ and a frequency domain location occupied by the first signal corresponding to the subcarrier spacing system parameter $\Delta_j$.

Optionally, the phase difference $\varphi$ satisfies the following relationship:

$$\varphi=2\pi\Delta_k \text{ or } \varphi=-2\pi\Delta k, \text{ where}$$

$\Delta k$ is a frequency domain spacing between frequency domain resources occupied by $S_{\Delta_i}(n)$ and $S_{\Delta_j}(n)$.

Optionally, the phase difference $\varphi$ is related to lengths of CPs respectively corresponding to the subcarrier spacing system parameter $\Delta_i$ and the subcarrier spacing system parameter $\Delta_j$ and frequency domain locations occupied by the first signals corresponding to the subcarrier spacing system parameter $\Delta_i$ and the subcarrier spacing system parameter $\Delta_j$.

Optionally, consecutive signals of the second signals respectively corresponding to the different subcarrier spacing system parameters in the subcarrier spacing system parameter group $\{\Delta_i\}$, $0<i\leq I$ within the occupied time length T are the same; or consecutive signals of the second signals respectively corresponding to the different subcarrier spacing system parameters in the subcarrier spacing system parameter group $\{\Delta_i\}$, $0<i\leq I$ within the occupied time length T differ by one cyclic shift or one phase.

Optionally, when consecutive signals of second signals respectively corresponding to a subcarrier spacing system parameter $\Delta_i$ and a subcarrier spacing system parameter $\Delta_j$ in the subcarrier spacing system parameter group $\{\Delta_i\}$, $0<i\leq I$ within the occupied time length T differ by one phase, the following condition is satisfied:

$$Y_{\Delta_i}(t)=Y_{\Delta_j}(t)e^{j\varphi t}, \text{ where}$$

$Y_{\Delta_i}(t)$ is the consecutive signals of the second signal corresponding to the subcarrier spacing system parameter $\Delta_i$ within the occupied time length T, $Y_{\Delta_j}(t)$ is the consecutive signals of the second signal corresponding to the subcarrier spacing system parameter $\Delta_j$ within the occupied time length T, and $\varphi$ is a phase difference between $Y_{\Delta_i}(t)$ and $Y_{\Delta_j}(t)$.

Optionally, when consecutive signals of second signals respectively corresponding to a subcarrier spacing system parameter $\Delta_i$ and a subcarrier spacing system parameter $\Delta_j$ in the subcarrier spacing system parameter group $\{\Delta_i\}$, $0<i\leq I$ within the occupied time length T differ by one cyclic shift, the following condition is satisfied:

$$Y_{\Delta_i}(t)=Y_{\Delta_j}(t+m), \text{ where}$$

$Y_{\Delta_i}(t)$ is the consecutive signals of the second signal corresponding to the subcarrier spacing system parameter $\Delta_i$ within the occupied time length T, $Y_{\Delta_j}(t+m)$ is consecutive signals obtained after cyclically shifting the second signal corresponding to the subcarrier spacing system parameter $\Delta_j$ within the occupied time length T by m.

Optionally, the consecutive signals of the second signals respectively corresponding to the different subcarrier spacing system parameters in the subcarrier spacing system parameter group $\{\Delta_i\}$, $0<i\leq I$ within the occupied time length T are periodically repeated.

Optionally, an integer quantity of times that the consecutive signals of the second signals respectively corresponding to the different subcarrier spacing system parameters within the occupied time length T are periodically repeated is R; and $$R=\frac{\max(\Delta_i)}{\min(\Delta_i)},$$

where $\min(\Delta_i)$ is a minimum subcarrier spacing system parameter in the subcarrier spacing system parameter group $\{\Delta_i\}$, $0<i\leq I$, and $\max(\Delta_i)$ is a maximum subcarrier spacing system parameter in the subcarrier spacing system parameter group $\{\Delta_i\}$, $0<i\leq I$.

Optionally, a length of a minimum period within which the consecutive signals of the second signals respectively corresponding to the different subcarrier spacing system parameters within the occupied time length T are repeated is a length of an OFDM symbol corresponding to the maximum subcarrier spacing system parameter in the subcarrier spacing system parameter group $\{\Delta_i\}$, $0<i\leq I$.

Optionally, a length of a minimum period within which the consecutive signals of the second signals respectively corresponding to the different subcarrier spacing system parameters within the occupied time length T are repeated is 1/R of a length of an OFDM symbol corresponding to the minimum subcarrier spacing system parameter in the subcarrier spacing system parameter group $\{\Delta_i\}$, $0<i\leq I$.

Optionally, a quantity of times that the second signal corresponding to the subcarrier spacing system parameter $\Delta_i$ in the subcarrier spacing system parameter group $\{\Delta_i\}$, $0<i\leq I$ is repeated within one OFDM symbol is $M_{\Delta_i}$; and $$M_{\Delta_i}=\frac{\max(\Delta_i)}{\Delta_i},$$

where $\max(\Delta_i)$ is the maximum subcarrier spacing system parameter in the subcarrier spacing system parameter group $\{\Delta_i\}$, $0<i\leq I$.

Optionally, second signals respectively corresponding to the $N_{\Delta_i}$ OFDM symbols occupied by the first signal corresponding to the subcarrier spacing system parameter $\Delta_i$ in the subcarrier spacing system parameter group $\{\Delta_i\}$, $0 \le i \le I$ differ by one cyclic shift.

Optionally, $N_{\Delta_i}$ effective OFDM symbols included in the second signal corresponding to the subcarrier spacing system parameter $\Delta_i$ in the subcarrier spacing system parameter group $\{\Delta_i\}$, $0 \le i \le I$ satisfy the following condition:

$$Z_{\Delta_i}^P(n) = Z_{\Delta_j}^P(n + m_{\Delta_i}^P), 0 \le n < L; \text{ and}$$

$$m_{\Delta_i}^P = N_{CP}^{\Delta_j} - \Sigma_{r=0}^{r=P} N_{CP,r}^{\Delta_i} \text{ or } m_{\Delta_i}^P = -(N_{CP}^{\Delta_j} - \Sigma_{r=0}^{r=P} N_{CP,r}^{\Delta_i}), \text{ where}$$

$Z_{\Delta_i}^P(n)$ is consecutive signals within the $p^{th}$ period that uses an effective symbol length of $\Delta_i$ as the minimum period and that are in the second signal corresponding to the subcarrier spacing system parameter $\Delta_i$, and $0 \le p < N_{\Delta_i}$.

$Z_{\Delta_j}^P(n)$ is consecutive signals within the $p^{th}$ period that correspond to the effective OFDM symbols and that are in the second signal corresponding to the subcarrier spacing system parameter $\Delta_j$ in the subcarrier spacing system parameter group $\{\Delta_i\}$, $0 \le i \le I$;

$N_{CP}^{\Delta_j}$ is the length of the CP corresponding to the subcarrier spacing system parameter $\Delta_j$; and $N_{CP,r}^{\Delta_i}$ is a length of a CP of the $r^{th}$ OFDM symbol corresponding to the subcarrier spacing system parameter $\Delta_i$.

Optionally, the first signal or the second signal corresponds to at least one of a downlink synchronization signal, a downlink measurement pilot reference signal, an uplink random access channel RACH signal, and an uplink channel sounding reference signal SRS, where the downlink synchronization signal includes a primary synchronization signal, or the downlink synchronization signal includes a primary synchronization signal and a secondary synchronization signal.

Optionally, the subcarrier spacing system parameter group $\{\Delta_i\}$, $0 \le i \le I$ includes some or all of subcarrier spacing system parameters supported by a system.

Optionally, the subcarrier spacing system parameter group $\{\Delta_i\}$, $0 \le i \le I$ is.

any one of {15 kHz, 30 kHz}, {60 kHz, 120 kHz}, {240 kHz, 480 kHz}, {15 kHz, 30 kHz, 60 kHz}, {120 kHz, 240 kHz, 480 kHz}, or {15 kHz, 30 kHz, 60 kHz, 120 kHz, 240 kHz, 480 kHz}.

Optionally, signals corresponding to the different subcarrier spacing system parameters included in the subcarrier spacing system parameter group $\{\Delta_i\}$, $0 \le i \le I$ are transmitted in a time division multiplexing or frequency division multiplexing manner.

Optionally, a frequency division multiplexing manner is used for the first signal and a data channel that correspond to the subcarrier spacing system parameter $\Delta_i$ in the subcarrier spacing system parameter group $\{\Delta_i\}$, $0 \le i \le I$, and an OFDM symbol corresponding to data carried in the data channel is generated based on the subcarrier spacing system parameter $\Delta_i$.

Optionally, the first network device is a wireless access device and the second network device is a terminal, or the first network device is a terminal and the second network device is a wireless access device.

According to a third aspect, an embodiment of this application provides a signal sending apparatus. The signal sending apparatus includes at least one unit, and the at least one unit is configured to implement the signal sending method provided in the foregoing first aspect or the various optional implementations of the first aspect.

According to a fourth aspect, an embodiment of this application provides a signal detection apparatus. The signal detection apparatus includes at least one unit, the at least one unit is configured to implement the foregoing at least one unit, and the at least one unit is configured to implement the signal detection method provided in the foregoing second aspect or the various optional implementations of the second aspect.

According to a fifth aspect, an embodiment of this application provides a network device. The network device includes a processor and a memory. The memory stores at least one instruction, at least one program, a code set or an instruction set, and the processor implements, by executing the at least one instruction, the at least one program, the code set or the instruction set, the signal sending method provided in the foregoing first aspect or the various optional implementations of the first aspect.

According to a sixth aspect, an embodiment of this application provides a network device. The network device includes a processor and a memory. The memory stores at least one instruction, at least one program, a code set or an instruction set, and the processor implements, by executing the at least one instruction, the at least one program, the code set or the instruction set, the signal detection method provided in the foregoing second aspect or the various optional implementations of the second aspect.

According to a seventh aspect, an embodiment of this application further provides a computer-readable medium. The computer-readable storage medium stores at least one instruction, at least one program, a code set or an instruction set. The at least one instruction, the at least one program, the code set or the instruction set may be executed by a processor of a network device, to implement an instruction of the signal sending method provided in the foregoing first aspect or the various optional implementations of the first aspect. Alternatively, the at least one instruction, the at least one program, the code set or the instruction set may be executed by a processor of a network device, to implement an instruction of the signal detection method provided in the foregoing second aspect or the various optional implementations of the second aspect.

DESCRIPTION OF EMBODIMENTS

To make the objectives, technical solutions, and advantages of this application clearer, the following further describes the implementations of this application in detail with reference to the accompanying drawings.

It should be understood that, "several" mentioned in this specification refers to one or more, and "a plurality of" refers to two or more. The term "and/or" describes an association relationship for describing associated objects and represents that three relationships may exist. For example, A and/or B may represent the following three cases: Only A exists, both A and B exist, and only B exists. The character "/" usually indicates an "or" relationship between the associated objects.

Figure 1:
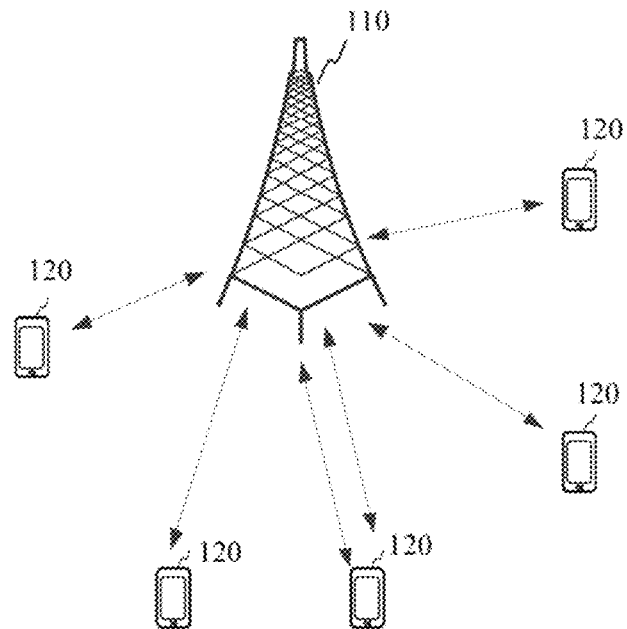
FIG. 1 is an architectural diagram of a network environment in this application.

FIG. 1 is an architectural diagram of a network environment in this application. The network environment includes the following network devices: a first network device 110 and a second network device 120.

The first network device 110 and the second network device 120 are located in a same wireless system. For example, the first network device 110 may be a wireless access device, and the second network device 120 may be a terminal (as shown in FIG. 1). Alternatively, different from FIG. 1, the first network device 110 may be a terminal, and the second network device 120 may be a wireless access device.

The wireless access device may be an independent base station, for example, a macro base station, a micro base station, or a picocell base station. Alternatively, the wireless access device may be a distributed base station that forms a cloud radio access network. Alternatively, the wireless access device may be a wireless router.

The terminal may include various handheld devices, in-vehicle devices, Internet of Things devices, wearable devices, and computing devices having a wireless communication function, or other processing devices connected to a wireless modem, and various forms of user equipments (User Equipment, UE for short), mobile stations (Mobile station, MS for short), terminals (terminal), terminal equipments (Terminal Equipment), soft terminals, and the like. For ease of description, in this application, the devices mentioned above are collectively referred to as a terminal or UE.

In this application, the wireless system in which the first network device 110 and the second network device 120 are located supports a plurality of different subcarrier spacing system parameters. Each subcarrier spacing system parameter applies to one or more wireless application scenarios. In addition, the plurality of different subcarrier spacing system parameters may be multiplexed in frequency domain, in time domain, or both in frequency domain and in time domain.

Figure 2:
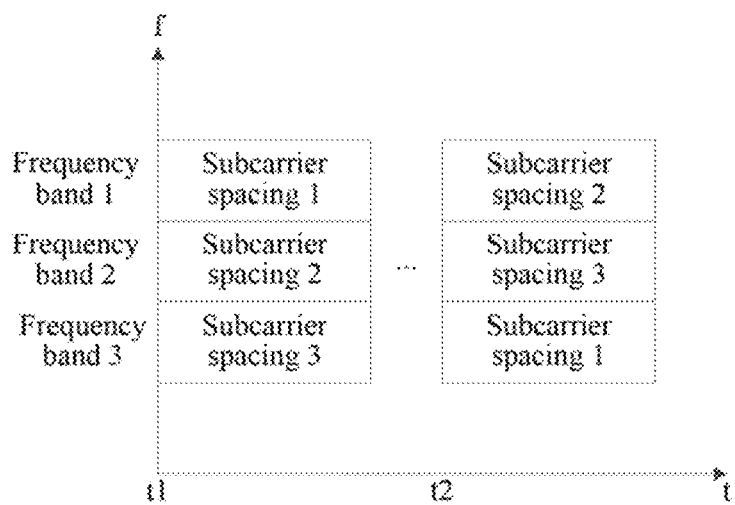
FIG. 2 is a schematic diagram of subcarrier spacing multiplexing in an embodiment shown in FIG. 1.

Specifically, FIG. 2 is a schematic diagram of subcarrier spacing multiplexing in an embodiment of this application. The wireless system includes a plurality of available frequency bands (FIG. 2 shows three frequency bands, which are a frequency band 1, a frequency band 2, and a frequency band 3 respectively) in frequency domain. In a period of time after a moment t1, the first network device or the second network device sends/receives a signal on the frequency band 1 by using a subcarrier spacing system parameter 1, sends/receives a signal on the frequency band 2 by using a subcarrier spacing system parameter 2, and sends/receives a signal on the frequency band 3 by using a subcarrier spacing system parameter 3. In a period of time after a moment t2, the first network device or the second network device sends/receives a signal on the frequency band 1 by using the subcarrier spacing system parameter 2, sends/receives a signal on the frequency band 2 by using the subcarrier spacing system parameter 3, and sends/receives a signal on the frequency band 3 by using the subcarrier spacing system parameter 1.

For the foregoing case in which the wireless system supports the plurality of different subcarrier spacings, and the plurality of different subcarrier spacings may be multiplexed in frequency domain/time domain, this application provides a signal sending method. An idea of the method is: When the first network device 110 sends a signal, at a same moment, specified signals (for example, signals needing to be detected in a wireless access process, such as a downlink synchronization signal, a downlink measurement pilot reference signal, an uplink random access channel RACH signal, and an uplink channel sounding reference signal SRS) sent based on different subcarrier spacing system parameters occupy a same quantity of subcarriers in frequency domain and occupy a same time length in time domain. When the second network device 120 receives the signal sent by the first network device 110, regardless of which type of a subcarrier spacing system parameter that the first network device 110 uses to send the signal, the specified signals included in the signal received by the second network device 120 are the same or differ by a particular phase/shift. In this way, when detecting the specified signals in the signal sent by the first network device 110, the second network device 120 may ignore impact of signal configurations corresponding to the different subcarrier spacing system parameters, thereby simplifying complexity of detecting the specified signals by the second network device 120, and improving communication efficiency of the wireless system.

Figure 3:
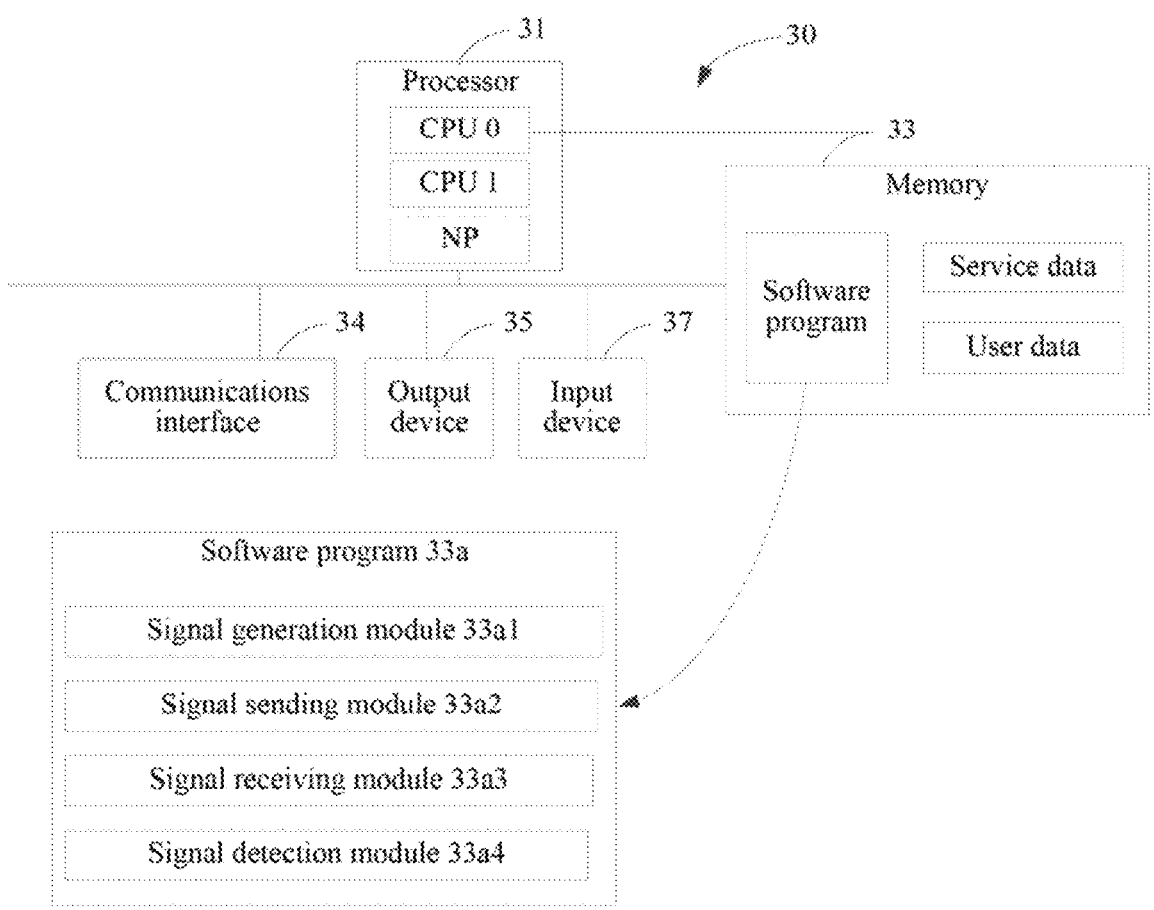
FIG. 3 is a schematic structural diagram of a network device according to an embodiment of this application.

FIG. 3 is a schematic structural diagram of a network device 30 according to an embodiment of this application. The network device 30 may be implemented as the first network device 110 or the second network device 120 in the network environment shown in FIG. 1. As shown in FIG. 3, the network device 30 may include a processor 31 and a communications interface 34.

The processor 31 may include one or more processing units. The processing unit may be a central processing unit (central processing unit, CPU), a network processor (network processor, NP), or the like.

The communications interface 34 may include a wired network interface, for example, an Ethernet interface or a fiber interface, or may include a wireless network interface, for example, a cellular mobile network interface. For example, when the network device is a wireless access device, the communications interface 34 may include both the wired network interface and the wireless network interface. The wired network interface may be configured to connect the network device 30 and an upper-layer network device in the wireless system, and the wireless network interface may be configured to communicate with a terminal in a signal coverage area. Alternatively, when the network device is a terminal, the communications interface 34 may include only a wireless network interface configured to communicate with a wireless access device or another terminal.

Optionally, the network device 30 may further include a memory 33. The processor 31 may be connected to the memory 33 and the communications interface 34 by using a bus.

The memory 33 stores at least one instruction, at least one program, a code set or an instruction set. The at least one instruction, the at least one program, the code set or the instruction set is loaded and executed by the processor 31 to implement steps that are to be performed by a first network device and that are related to signal sending in subsequent embodiments of this application. Alternatively, the at least one instruction, the at least one program, the code set or the instruction set is loaded and executed by the processor 31 to implement steps that are to be performed by a second network device and that are related to signal detection in subsequent embodiments.

For example, in FIG. 3, the memory 33 may be configured to store a software program 33a, and the software program 33a may be executed by the processor 31. In addition, the memory 33 may further store various types of service data or user data.

Optionally, as shown in FIG. 3, when the network device 30 is implemented as the first network device 110 in the network environment shown in FIG. 1, the software program 33a may include a signal generation module 33a1 and a signal sending module 33a2.

The signal generation module 33a1 is configured to: map, onto a time frequency resource, a first signal that is in frequency domain and that corresponds to a subcarrier spacing parameter in a subcarrier spacing system parameter group $\{\Delta_i\}$, $0<i\le I$, and generate a second signal that is in time domain and that corresponds to the first signal.

The signal sending module 33a2 is configured to send the second signal to a second network device by using the communications interface 34.

Optionally, as shown in FIG. 3, when the network device 30 is implemented as the second network device 120 in the network environment shown in FIG. 1, the software program 33a may include a signal generation module 33a1, a signal receiving module 33a3, and a signal detection module 33a4.

The signal receiving module 33a3 is configured to receive a signal sent by a first network device.

The signal detection module 33a4 is configured to perform signal detection on the received signal based on the generated second signal.

Optionally, the network device 30 may further include an output device 35 and an input device 37. The output device 35 and the input device 37 are connected to the processor 31. The output device 35 may be a display configured to display information, a power amplifier device playing a sound, a printer, or the like. The output device 35 may further include an output controller, configured to provide output to the display screen, the power amplifier device, or the printer. The input device 37 may be a device used by a user to enter information, such as a mouse, a keyboard, an electronic stylus, or a touch panel. The input device 37 may further include an input controller configured to receive and process input coming from the device such as the mouse, the keyboard, the electronic stylus, or the touch panel.

In addition, an embodiment of this application further provides a computer-readable storage medium. The computer-readable storage medium stores at least one instruction, at least one program, a code set or an instruction set. The at least one instruction, the at least one program, the code set or the instruction set may be executed by a processor of a network device to complete steps that are to be performed by a first network device and that are related to signal sending in subsequent embodiments of this application. Alternatively, the at least one instruction, the at least one program, the code set or the instruction set may be executed by a processor of a network device to complete steps that are to be performed by a second network device and that are related to signal detection in subsequent embodiments of this application.

The computer-readable storage medium may be a ROM, a random-access memory (RAM), a CD-ROM, a magnetic tape, a floppy disk, an optical data storage device, or the like.

Figure 4:
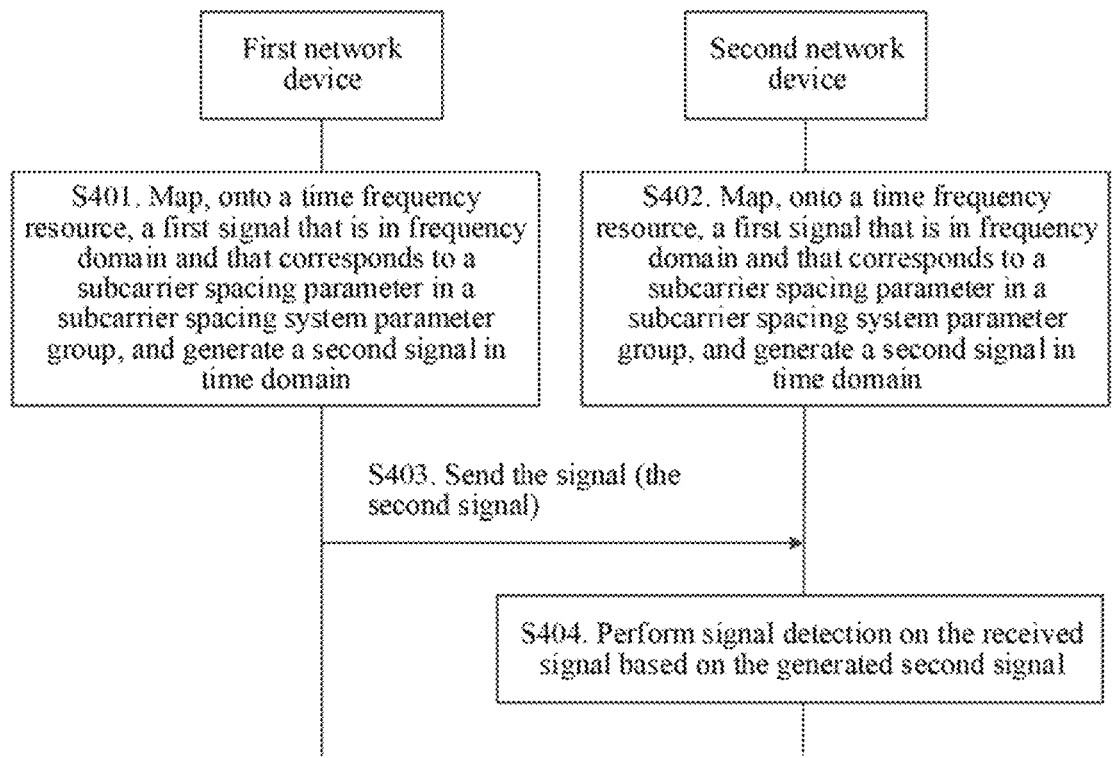
FIG. 4 is a flowchart of a signal sending method according to an embodiment of this application.

FIG. 4 is a flowchart of a signal sending method according to an embodiment of this application. The method may be applied to the first network device 110 in the network environment shown in FIG. 1. As shown in FIG. 4, the signal sending method may include the following steps.

Step 401. The first network device maps, onto a time frequency resource, a first signal that is in frequency domain and that corresponds to a subcarrier spacing parameter in a subcarrier spacing system parameter group $\{\Delta_i\}$, $0<i\le I$, and generates a second signal that is in time domain and that corresponds to the first signal.

The second signal is an OFDM symbol in time domain, the OFDM symbol includes an effective OFDM symbol and a cyclic prefix of the effective OFDM symbol, I is a quantity of subcarrier spacing system parameters in the subcarrier spacing system parameter group $\{\Delta_i\}$, $0<i\le I$, I is an integer greater than or equal to 2, any two subcarrier spacing system parameters in the subcarrier spacing system parameter group $\{\Delta_i\}$, $0<i\le I$ satisfy a multiple relationship of $2^c$, and c is an integer greater than 1.

$\{\Delta_i\}$, $0<i\le I$ represents a set formed by different subcarrier spacing system parameters, the set includes I elements, and the set may alternatively be represented as $\{\Delta_1, \Delta_2, \ldots, \Delta_I\}$.

First signals and second signals respectively corresponding to different subcarrier spacing system parameters in the subcarrier spacing system parameter group $\{\Delta_i\}$, $0<i\le I$ have the following characteristics:

the first signals corresponding to the different subcarrier spacing system parameters occupy a same quantity of subcarriers, and the second signals corresponding to the different subcarrier spacing system parameters occupy a same time length T.

The solution in this embodiment of this application may be applied to a communications system that is based on an OFDM (Orthogonal Frequency Division Multiplexing, orthogonal frequency division multiplexing) technology. In the communications system supporting the OFDM technology, to satisfy orthogonality between subcarriers, a length of one OFDM symbol is usually set to be a reciprocal of a corresponding subcarrier spacing system parameter. In this embodiment of this application, any two of a plurality of subcarrier spacing system parameters supported by a wireless system need to satisfy a multiple relationship of $2^c$, where c is an integer greater than 1. The noun "subcarrier spacing system parameter" in this embodiment of this application refers to such a system parameter as a subcarrier spacing. In other words, the "subcarrier spacing system parameter" is equivalent to a "subcarrier spacing" in general meanings.

For example, the subcarrier spacing system parameters supported by the wireless system are $\Delta_0, \Delta_1, \Delta_2 \ldots$, where a minimum subcarrier spacing system parameter is $\Delta_0$. Any one of the other subcarrier spacing system parameters may be $2^c\Delta_0$. For example, $\Delta_1=2\Delta_0$, $\Delta_2=2\Delta_1=2^2\Delta_0$, and by analog. Correspondingly, because the length of the OFDM symbol is the reciprocal of the corresponding subcarrier spacing system parameter, lengths of OFDM symbols corresponding to the different subcarrier spacing system parameters also satisfy the multiple relationship of $2^c$. That is, a length of an OFDM symbol corresponding to the subcarrier spacing system parameter is $\Delta_0$ twice a length of an OFDM symbol corresponding to the subcarrier spacing system parameter $\Delta_1$, is 2 times a length of an OFDM symbol corresponding to the subcarrier spacing system parameter $\Delta_2$, and by analog.

Figure 5:
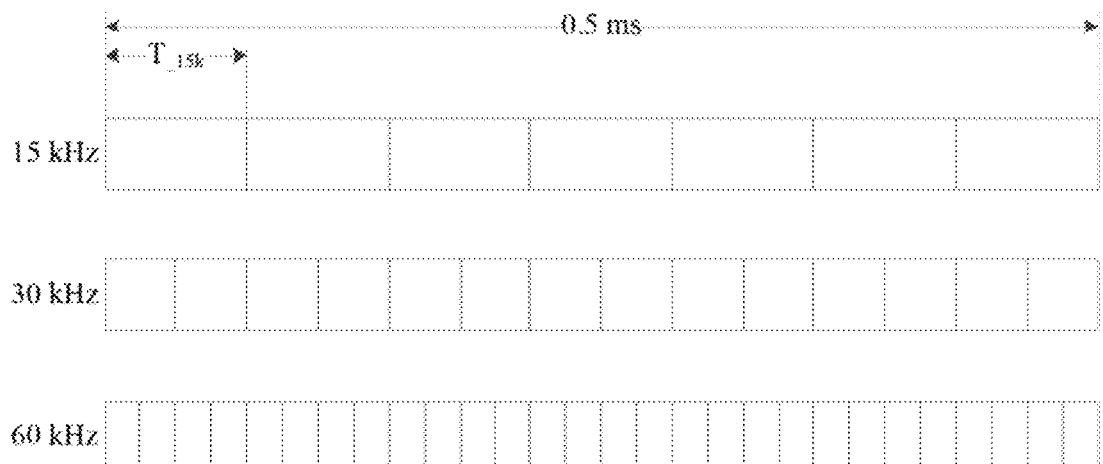
FIG. 5 is a diagram of comparison between lengths of OFDM symbols in a case of different subcarrier spacings in the embodiment shown in FIG. 4.

For example, FIG. 5 is a diagram of comparison between lengths of OFDM symbols in a case of different subcarrier spacings according to this embodiment of this application. That one timeslot is 0.5 ms is used as an example. For a subcarrier whose subcarrier spacing system parameter is 15 kHz, one timeslot includes seven OFDM symbols each having a symbol length of $T_{-1sk}$. One OFDM symbol corresponding to a 15 kHz subcarrier spacing system parameter is equivalent to including two OFDM symbols corresponding to a 30 kHz subcarrier spacing system parameter, and is equivalent to including four OFDM symbol corresponding to a 60 kHz subcarrier spacing system parameter.

Optionally, the subcarrier spacing system parameter group $\{\Delta_i\}$, $0 < i \le I$ includes some or all of the subcarrier spacing system parameters supported by the system.

In this embodiment of this application, the plurality of subcarrier spacing system parameters supported by the wireless system may be grouped, and at least two subcarrier spacing system parameters may be classified into one subcarrier spacing group. When a subcarrier spacing system parameter corresponds to a first signal and a second signal, signal generation is performed for a subcarrier spacing group in which the subcarrier spacing system parameter is located. A specific grouping manner may be as follows:

For example, using six subcarrier spacing system parameters supported by a wireless system as an example, the six subcarrier spacing system parameters are 15 kHz, 30 kHz, 60 kHz, 120 kHz, 240 kHz, and 480 kHz respectively. The six subcarrier spacing system parameters may be classified into three subcarrier spacing system parameter groups, which are respectively:

{15 kHz, 30 kHz};
{60 kHz, 120 kHz}; and
{240 kHz, 480 kHz}.

Alternatively, the six subcarrier spacing system parameters may be classified into two subcarrier spacing system parameter groups, which are respectively:

{15 kHz, 30 kHz, 60 kHz}; and
{120 kHz, 240 kHz, 480 kHz}.

Alternatively, the six subcarrier spacing system parameters may be classified into one subcarrier spacing system parameter group. That is, the subcarrier spacing system parameter group is:

{15 kHz, 30 kHz, 60 kHz, 120 kHz, 240 kHz, 480 kHz}.

That is, in this embodiment of this application, the subcarrier spacing system parameter group $\{\Delta_i\}$, $0 < i \le I$ may be any one of {15 kHz, 30 kHz}, {60 kHz, 120 kHz}, {240 kHz, 480 kHz}, {15 kHz, 30 kHz, 60 kHz}, {120 kHz, 240 kHz, 480 kHz}, or {15 kHz, 30 kHz, 60 kHz, 120 kHz, 240 kHz, 480 kHz}.

It should be noted that in an actual application, as a quantity of and specific values of subcarrier spacing system parameters supported by the wireless system are different, there may be another grouping manner. This embodiment of this application imposes no limitation on a grouping manner of a subcarrier spacing system parameter group in the wireless system, provided that any two subcarrier spacing system parameters in a same subcarrier spacing system parameter group satisfy the multiple relationship of $2^c$.

Unless otherwise particularly stated, the different subcarrier spacing system parameters in this embodiment of this application are different subcarrier spacing system parameters in a same subcarrier spacing system parameter group.

For the foregoing characteristics, a signal generation method based on the OFDM technology is designed in the solution in this embodiment of this application, so that within a same period of time, in a case of different subcarrier spacings, generated first signals in frequency domain are the same or differ by one phase, and generated second signals in time domain are the same or differ by one cyclic shift/circumferential shift within a specific time interval.

Two concepts, namely, the circumferential shift and the CP (Cyclic Prefix, cyclic prefix), in the following content in this embodiment of this application are first described below.

1. Circumferential shift. A circumferential shift of a finite sequence x(n) means that the sequence is extended into a periodic sequence x%(n) by using a quantity of sampling points in the sequence (that is, a quantity of elements in the sequence) as a period, the periodic sequence x%(n) is shifted, and then, a sequence value in a principal value interval (n=0 to N−1) or (n=0 to Z−1) of an obtained sequence is taken. Mathematical formulas of the circumferential shift and the periodic sequence are expressed as follows:

$$R_N(n) = \begin{cases} 1, & 0 \le n \le N-1 \\ 0, & \text{else} \end{cases} ; \text{and}$$

$$x_m(n) = x((n+m))_N R_N(n), 0 \le n \le N-1, 0 \le m \le N-1; \text{or}$$

$$x_m(n) = x((n+m))_N R_Z(n), 0 \le n \le Z-1, 0 \le m \le N-1, \text{where}$$

$$x((n+m))_N = x((n+m)\bmod N),$$

and m is a value of a shift.

Specifically, for example, the sequence x(n) is x(0), x(1), x(2), . . . , and x(N−1). Assuming that the shift m is 2, a sequence obtained after a circumferential shift is x(2), x(3), . . . , x(N−1), x(0), and x(1). This is equivalent to that first two elements in the sequence are moved to a tail of the sequence.

2. Cyclic prefix. The cyclic prefix is a cyclic structure formed by copying a last segment of elements in a sequence to the front of the sequence. An objective is to ensure that OFDM symbols with a latency always has a period of an integer multiple in an FFT (Fast Fourier Transformation, fast Fourier transformation) integration period, to eliminate inter-subcarrier interference and inter-symbol interference.

Figure 6:
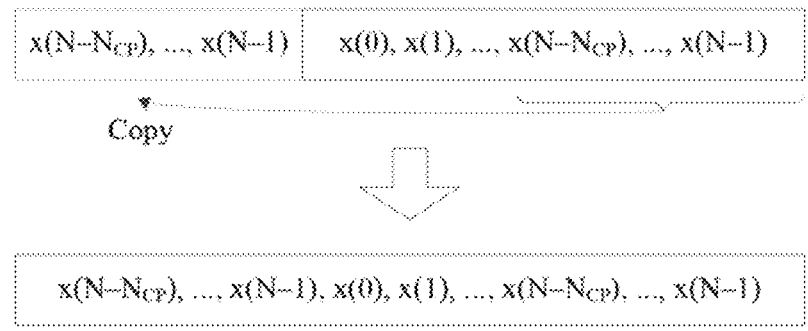
FIG. 6 is a diagram of a relationship between a cyclic prefix and an OFDM symbol in the embodiment shown in FIG. 4.

Specifically, FIG. 6 is a diagram of a relationship between a cyclic prefix and an OFDM symbol in this embodiment of this disclosure. A quantity of sampling points in the cyclic prefix is $N_{CP}$, and one OFDM symbol includes a total of N sampling points: x(0), x(1), . . . , x(N−$N_{CP}$), . . . , and x(N−1). When a cyclic prefix is added, last $N_{CP}$ sampling points in the OFDM symbol are copied to the front of the OFDM symbol, so that a sequence included in a finally generated symbol is x(N−$N_{CP}$), . . . , x(N−1), x(0), x(1), . . . , x(N−$N_{CP}$), . . . , and x(N−1), in which there are a total of N+$N_{CP}$ sampling points.

It should be noted that in this embodiment of this application, an OFDM symbol includes an effective OFDM symbol and a cyclic prefix. That is, an effective OFDM symbol in an OFDM symbol is a part in the OFDM symbol other than the cyclic prefix. For example, using the OFDM symbol shown in FIG. 6 as an example, a cyclic prefix in the OFDM symbol is x(N−$N_{CP}$), . . . , and x(N−1), and x(0), $x(1), \ldots, x(N-N_{CP}), \ldots,$ and $x(N-1)$ other than the cyclic prefix are an effective OFDM symbol in the OFDM symbol.

Based on the foregoing descriptions of the circumferential shift and the cyclic prefix, first signals and second signals respectively corresponding to different subcarrier spacing system parameters in a same subcarrier spacing system parameter group will be described in detail in the following content in this embodiment of this application.

Any two adjacent frequency domain resources mapped within a same OFDM symbol from a first signal corresponding to any subcarrier spacing system parameter $\Delta_i$ in the subcarrier spacing system parameter group $\{\Delta_i\}$, $0<i\leq I$ have a same frequency domain spacing $\Delta f$, and the first signals corresponding to the different subcarrier spacing system parameters correspond to same $\Delta f$.

In this embodiment of this application, the first signals corresponding to the different subcarrier spacing system parameters occupy the same quantity of subcarriers, and the second signals corresponding to the different subcarrier spacing system parameters occupy the same time length T. This is specifically embodied as that the first signals corresponding to the different subcarrier spacing system parameters have a same sequence length in frequency domain but occupy different quantities of OFDM symbols, and the quantities of OFDM symbols occupied by the first signals corresponding to the different subcarrier spacing system parameters also satisfy the multiple relationship of $2^c$.

Figure 7:
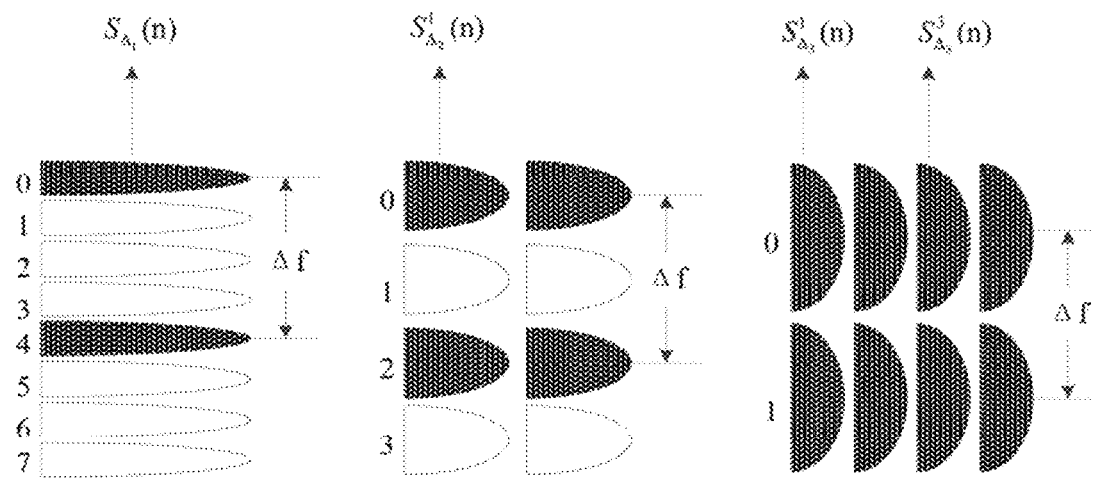
FIG. 7 is a schematic diagram of comparison between first signals in the embodiment shown in FIG. 4.
Figure 7:
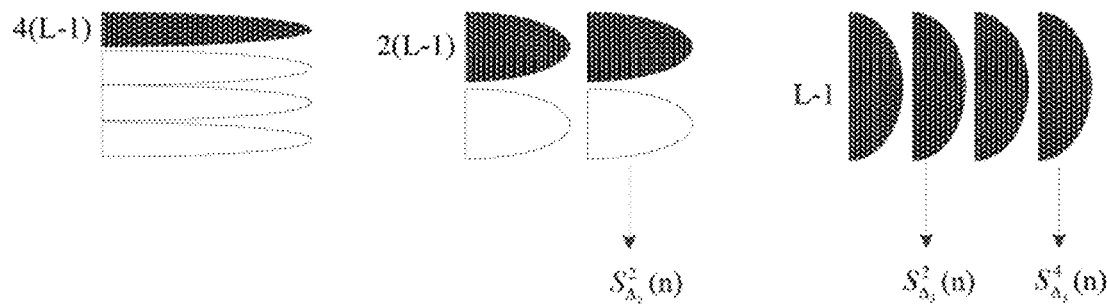

Specifically, FIG. 7 is a schematic diagram of comparison between first signals in this embodiment of this application. In FIG. 7, the subcarrier spacing system parameter group $\{\Delta_1\}$ includes three subcarrier spacing system parameters, namely, $\Delta_1$, $\Delta_2$, and $\Delta_3$, and $\Delta_3=2\Delta_2=4\Delta_1$. A first signal corresponding to the subcarrier spacing system parameter $\Delta_1$ occupies one OFDM symbol, and a signal sequence of the first signal in frequency domain is $s_{\Delta_1}(n)$. A first signal corresponding to the subcarrier spacing system parameter $\Delta_2$ occupies two OFDM symbols, a signal sequence that is in frequency domain and that corresponds to the first OFDM symbol is $S_{\Delta_2}^{1}(n)$, and a signal sequence that is in frequency domain and that corresponds to the second OFDM symbol is $S_{\Delta_2}^{2}(n)$. A first signal corresponding to the subcarrier spacing system parameter $\Delta_3$ occupies four OFDM symbols, signal sequences in frequency domain that correspond to the first to the fourth OFDM symbols are $S_{\Delta_3}^{1}(n)$, $S_{\Delta_3}^{2}(n)$, $S_{\Delta_3}^{3}(n)$, and $S_{\Delta_3}^{4}(n)$ respectively, where $0\leq n<L$, and L is a length of a signal sequence in frequency domain, and is also a quantity of subcarriers occupied by the first signal corresponding to each subcarrier spacing system parameter. In FIG. 7, each padding block represents one RE (Resource Element, resource element) used for mapping the first signal.

As shown in FIG. 7, for $\Delta_1$, $\Delta_2$, and $\Delta_3$, a frequency domain spacing $\Delta f$ between a first subcarrier and a second subcarrier mapped from the first signal corresponding to $\Delta_1$, a frequency domain spacing $\Delta f$ between the second subcarrier and a third subcarrier (not shown in FIG. 7) mapped from the first signal corresponding to $\Delta_1$, ..., and a frequency domain spacing $\Delta f$ between an $(N-1)^{th}$ subcarrier and an $N^{th}$ subcarrier mapped from the first signal corresponding to $\Delta_1$ are the same. Likewise, a frequency domain spacing $\Delta f$ between a first subcarrier and a second subcarrier mapped from the first signal corresponding to $\Delta_2$ or $\Delta_3$, a frequency domain spacing $\Delta f$ between the second subcarrier and a third subcarrier mapped from the first signal corresponding to $\Delta_2$ or $\Delta_3$, ..., and a frequency domain spacing $\Delta f$ between an $(N-1)^{th}$ subcarrier and an $N^{th}$ subcarrier mapped from the first signal corresponding to $\Delta_2$ or $\Delta_3$ are also the same.

In addition, the first signals corresponding to the different subcarrier spacing system parameters have a same frequency domain spacing between adjacent subcarriers mapped in frequency domain. For example, the frequency domain spacing $\Delta f$ between the first subcarrier and the second subcarrier mapped from the first signal corresponding to $\Delta_1$ is also the same as the frequency domain spacing $\Delta f$ between the first subcarrier and the second subcarrier mapped from the first signal corresponding to $\Delta_2$.

Optionally, $\Delta f$ is equal to $\max(\Delta_1)$, and $\max(\Delta_1)$ is a maximum subcarrier spacing system parameter in the subcarrier spacing system parameter group $\{\Delta_i\}$, $0<i\leq I$.

For example, in FIG. 7, the maximum subcarrier spacing system parameter in the subcarrier spacing system parameter group $\{\Delta_1\}$ is $\Delta_3$. In this case, $\Delta f$ is equal to $\Delta_3$.

Optionally, a frequency domain spacing between any two adjacent frequency domain resources mapped within a same OFDM symbol from a first signal corresponding to any subcarrier spacing system parameter $\Delta_1$ in the subcarrier spacing system parameter group $\{\Delta_i\}$, $0<i\leq I$ corresponds to a same quantity $M_{\Delta_i}$ of subcarriers; and $$M_{\Delta_i} = \frac{\max(\Delta_i)}{\Delta_i},$$

where $\max(\Delta_i)$ is a maximum subcarrier spacing system parameter in the subcarrier spacing system parameter group $\{\Delta_i\}$, $0<i\leq I$.

For example, in FIG. 7, the maximum subcarrier spacing system parameter in the subcarrier spacing system parameter group $\{\Delta_i\}$ is $\Delta_3$, where $\Delta_3=2\Delta_2=4\Delta_1$. In this case, a frequency domain spacing $\Delta f$ between any two adjacent frequency domain resources mapped within a same OFDM symbol from the first signal corresponding to correspond to four subcarriers, a frequency domain spacing $\Delta f$ between any two adjacent frequency domain resources mapped within a same OFDM symbol from the first signal corresponding to correspond to two subcarriers, and a frequency domain spacing $\Delta f$ between any two adjacent frequency domain resources mapped within a same OFDM symbol from the first signal corresponding to $\Delta_3$ correspond to one subcarrier.

Optionally, data mapped on $M\Delta_i-1$ subcarriers spaced by the adjacent frequency domain resources mapped within the same OFDM symbol from the first signal corresponding to any subcarrier spacing system parameter $\Delta_i$ in the subcarrier spacing system parameter group $\{\Delta_i\}$, $0<i\leq I$ is 0.

For example, in FIG. 7, there are three subcarriers spaced by any two adjacent frequency domain resources mapped within a same OFDM symbol from the first signal corresponding to $\Delta_1$, and data mapped on the spacing subcarriers is 0. Similarly, there is one subcarrier spaced by any two adjacent frequency domain resources mapped within a same OFDM symbol from the first signal corresponding to $\Delta_2$, and data mapped on the spacing subcarrier is 0. There is no other subcarrier between any two adjacent frequency domain resources mapped within a same OFDM symbol from the first signal corresponding to $\Delta_3$.

Optionally, an index of a subcarrier mapped within the same OFDM symbol from the first signal corresponding to any subcarrier spacing system parameter $\Delta_i$ in the subcarrier spacing system parameter group $\{\Delta_i\}$, $0<i\leq I$ satisfies $m_{\Delta_i}*k$, where k is an integer.

For example, in FIG. 7, index numbers of subcarriers (including a subcarrier mapped from the first signal and a subcarrier on which mapped data is 0) within a frequency domain resource interval occupied by a first signal corresponding to each different subcarrier spacing system parameter start from 0. Indexes of subcarriers occupied by the first signal corresponding to $\Delta_1$ are 4*0, 4*1, . . . , and 4*(L−1) respectively. Indexes of subcarriers occupied by the first signal corresponding to are 2*0, 2*1, . . . , and 2*(L−1) respectively. Indexes of subcarriers occupied by the first signal corresponding to $\Delta_3$ are 1*0, 1*1, . . . , and 1*(L−1) respectively. It should be noted that the index number herein is used to index, starting from 0, each subcarrier within the frequency domain resource interval occupied by the first signal corresponding to the single subcarrier spacing system parameter, and a frequency domain spacing between subcarriers corresponding to different adjacent index numbers is a current subcarrier spacing system parameter. All other frequency domain resources (including other frequency domain resources on a frequency band corresponding to the current subcarrier spacing system parameter and all frequency domain resources on frequency bands corresponding to other subcarrier spacing system parameters in the subcarrier spacing system parameter group $\{\Delta_i\}$) than the frequency domain resource interval occupied by the first signal corresponding to the current subcarrier spacing system parameter do not fall within a numbering range.

Optionally, a first signal or a second signal corresponding to any subcarrier spacing system parameter $\Delta_i$ in the subcarrier spacing system parameter group $\{\Delta_i\}$, 0<i≤I includes $N_{\Delta_i}$ consecutive OFDM symbols; and $$N_{\Delta_i} = \frac{\Delta_i}{\min(\Delta_i)},$$

where $\min(\Delta_i)$ is a minimum subcarrier spacing system parameter in the subcarrier spacing system parameter group $\{\Delta_i\}$, 0<i≤I.

In this embodiment of this application, a quantity of consecutive OFDM symbols included in a first signal or a second signal corresponding to any subcarrier spacing system parameter in a subcarrier spacing system parameter group is a ratio of the subcarrier spacing system parameter group to a minimum subcarrier spacing system parameter in the subcarrier spacing system parameter group. For example, in FIG. 7, the minimum subcarrier spacing system parameter in the subcarrier spacing system parameter group is $\Delta_1$. In this case, the first signal or a second signal corresponding to $\Delta_1$ includes one OFDM symbol, the first signal or a second signal corresponding to $\Delta_2$ includes two consecutive OFDM symbols, and the first signal or a second signal corresponding to $\Delta_3$ includes four consecutive OFDM symbols.

Optionally, signal sequences respectively mapped within one OFDM symbol from the first signals corresponding to the different subcarrier spacing system parameters in the subcarrier spacing system parameter group $\{\Delta_i\}$, 0<i≤I are exactly the same; or signal sequences respectively mapped within one OFDM symbol from the first signals corresponding to the different subcarrier spacing system parameters in the subcarrier spacing system parameter group $\{\Delta_i\}$, 0<i≤I differ by one phase.

For example, in FIG. 7, a signal sequence $S_{\Delta_1}(n)$ mapped within one OFDM symbol from the first signal corresponding to $\Delta_1$ and a signal sequence $S_{\Delta_2}^1(n)$ or $S_{\Delta_2}^2(n)$ mapped within two OFDM symbols from the first signal corresponding to $\Delta_2$ satisfy a relationship of being exactly the same or differing by one phase, and $S_{\Delta_1}(n)$ and any one of signal sequences $S_{\Delta_3}^1(n)$, $S_{\Delta_3}^2(n)$, $S_{\Delta_3}^3(n)$ or $S_{\Delta_3}^4(n)$ mapped within four OFDM symbols from the first signal corresponding to $\Delta_3$ satisfy a relationship of being exactly the same or differing by one phase. $S_{\Delta_2}^1(n)$ or $S_{\Delta_2}^2(n)$ and any one of $S_{\Delta_3}^1(n)$, $S_{\Delta_3}^2(n)$, $S_{\Delta_3}^3(n)$, or $S_{\Delta_3}^4(n)$ also satisfy a relationship of being exactly the same or differing by one phase.

Optionally, $N_{\Delta_i}$ sequences mapped within the $N_{\Delta_i}$ OFDM symbols occupied by the first signal corresponding to any subcarrier spacing system parameter $\Delta_i$ in the subcarrier spacing system parameter group $\{\Delta_i\}$, 0<i≤I differ by one phase.

For example, in FIG. 7, the signal sequence $S_{\Delta_2}^1(n)$ and $S_{\Delta_2}^2(n)$ respectively mapped within the two OFDM symbols from the first signal corresponding to $\Delta_2$ satisfy the relationship of being exactly the same or differing by one phase, and any two of $S_{\Delta_3}^1(n)$, $S_{\Delta_3}^2(n)$, $S_{\Delta_3}^3(n)$ or $S_{\Delta_3}^4(n)$ also satisfy the relationship of being exactly the same or differing by one phase.

Optionally, a phase difference between the $N_{\Delta_i}$ sequences mapped within the $N_{\Delta_i}$ OFDM symbols occupied by the first signal corresponding to the subcarrier spacing system parameter $\Delta_i$ is related to a length of a cyclic prefix CP corresponding to the subcarrier spacing system parameter $\Delta_i$.

For example, in FIG. 7, a phase difference between the signal sequence $S_{\Delta_2}^1(n)$ and $S_{\Delta_2}^2(n)$ respectively mapped within the two OFDM symbols from the first signal corresponding to $\Delta_2$ is related to a length of a cyclic prefix CP corresponding to $\Delta_2$. Similarly, a phase difference between any two of $S_{\Delta_3}^1(n)$, $S_{\Delta_3}^2(n)$, $S_{\Delta_3}^3(n)$, or $S_{\Delta_3}^4(n)$ is related to a length of a cyclic prefix CP corresponding to $\Delta_3$.

Optionally, when signal sequences respectively mapped within one OFDM symbol from first signals corresponding to a subcarrier spacing system parameter $\Delta_i$ and a subcarrier spacing system parameter $\Delta_j$ in the subcarrier spacing system parameter group $\{\Delta_i\}$, 0<i≤I differ by one phase, the following condition is satisfied:

$S_{\Delta_i}(n) = S_{\Delta_j}(n)e^{j\varphi k(n)}, 0 \leq n \leq L$, where

L is a sequence length of the first signal corresponding to any subcarrier spacing system parameter in the subcarrier spacing system parameter group $\{\Delta_i\}$, 0<i≤I, $\varphi$ is a phase difference between the signal sequences respectively mapped within one OFDM symbol from the first signals corresponding to the subcarrier spacing system parameter $\Delta_i$ and the subcarrier spacing system parameter $\Delta_j$, $S_{\Delta_i}(n)$ and $S_{\Delta_j}(n)$ are respectively the sequences of the first signals for the subcarrier spacing system parameter $\Delta_i$ and the subcarrier spacing system parameter $\Delta_j$ within the OFDM symbol, and k(n) is a frequency of a subcarrier occupied by the $n^{th}$ sequence symbol in $S_{\Delta_j}(n)$.

Optionally, a signal sequence mapped within one corresponding OFDM symbol from a first signal for a subcarrier spacing system parameter $\Delta_i$ in the subcarrier spacing system parameter group $\{\Delta_i\}$, 0<i≤I and a signal sequence mapped within one corresponding OFDM symbol from a first signal corresponding to a subcarrier spacing system parameter $\Delta_j$ in the subcarrier spacing system parameter group $\{\Delta_i\}$, 0<i≤I differ by one phase; and $S_{\Delta_i}^p(n) = S_{\Delta_j}^q(n)e^{j\varphi k(n)}, 0 \leq n < L$, where L is a sequence length of the first signal corresponding to any subcarrier spacing system parameter in the subcarrier spacing system parameter group $\{\Delta_i\}$, 0<i≤I;

$S_{\Delta_i}^p(n)$ is a signal sequence mapped within the $p^{th}$ of $N_{\Delta_i}$ OFDM symbols occupied by the first signal for the subcarrier spacing system parameter $\Delta_i$;

$S_{\Delta_j}^q(n)$ is a signal sequence mapped within the $q^{th}$ of $N\Delta_j$ OFDM symbols occupied by the first signal for the subcarrier spacing system parameter $\Delta_j$, and k(n) is a frequency of a subcarrier occupied by the $n^{th}$ sequence symbol in $S\Delta_j(n)$; and φ is a phase difference between $S_{\Delta_i}^p(n)$ and $S_{\Delta_j}^p(n)$, and β is related to a length of a CP corresponding to the subcarrier spacing system parameter $\Delta_i$ and a length of a CP corresponding to the subcarrier spacing system parameter $\Delta_j$.

For example, in FIG. 7, a phase difference φ between a signal sequence $S_{\Delta_2}^2(n)$ mapped within the second OFDM symbol from the first signal corresponding to $\Delta_2$ and a signal sequence $S_{\Delta_3}^3(n)$ mapped within the third OFDM symbol to the first signal corresponding to $\Delta_3$ is related to a length of a CP corresponding to $\Delta_2$ and a length of a CP corresponding to $\Delta_3$.

Optionally, φ is related to the length of the CP corresponding to the subcarrier spacing system parameter $\Delta_i$, the length of the CP corresponding to the subcarrier spacing system parameter $\Delta_j$, p, and q.

For example, in FIG. 7, the phase difference φ between $S_{\Delta_2}^2(n)$ and $S_{\Delta_3}^3(n)$ s further related to a sequential order of the OFDM symbols respectively occupied by the two signal sequences in addition to the length of the CP corresponding to $\Delta_2$ and the length of the CP corresponding to $\Delta_3$.

Optionally, when the subcarrier spacing system parameter $\Delta_j$ is the minimum subcarrier spacing system parameter in the subcarrier spacing system parameter group $\{\Delta_i\}$, 0<i≤I, and $S_{\Delta_i}^p(n)=S_{\Delta_j}^q(n)e^{\varphi k(n)}$, $\varphi=2\pi(N_{CP}^{\Delta_j}+\Sigma_{r=0}^{r=p}N_{CP,r}^{\Delta_i})$ or $\varphi=2\pi(N_{CP}^{\Delta_j}-\Sigma_{r=0}^{r=p}N_{CP,r}^{\Delta_i})$, where $N_{CP}^{\Delta_j}$ is the length of the CP corresponding to the subcarrier spacing system parameter $\Delta_j$, $N_{CP,r}^{\Delta_i}$ is a length of a CP of the $r^{th}$ OFDM symbol corresponding to the subcarrier spacing system parameter $\Delta_i$, θ≤p<$N_{\Delta_i}$, and q=0.

For example, in FIG. 7, $S_{\Delta_j}^q(n)$ is $S_{\Delta_1}(n)$ and it is assumed that $S_{\Delta_i}^p(n)$ is $S_{\Delta_3}^3(n)$. In this case, the phase difference between $S_{\Delta_1}(n)$ and $S_{\Delta_3}^3(n)$ is numerically equal to $2\pi$ times a difference obtained by subtracting a sum of cyclic prefixes of first three OFDM symbols of the first signal corresponding to $\Delta_3$ from a cyclic prefix of an OFDM symbol of the first signal corresponding to $\Delta_1$.

Optionally, when the signal sequences respectively mapped within one OFDM symbol from the first signals corresponding to the subcarrier spacing system parameter $\Delta_i$ and the subcarrier spacing system parameter $\Delta_j$ in the subcarrier spacing system parameter group $\{\Delta_i\}$, 0<i≤I differ by one phase, and the condition $S_{\Delta_i}(n)=S_{\Delta_j}(n)e^{i\varphi k(n)}$, 0≤n≤L is satisfied, the phase difference φ is related to a frequency domain location occupied by the first signal corresponding to the subcarrier spacing system parameter $\Delta_i$ and a frequency domain location occupied by the first signal corresponding to the subcarrier spacing system parameter $\Delta_j$.

For example, in FIG. 7, the phase difference between $S_{\Delta_1}(n)$ and $S_{\Delta_2}^1$ or $S_{\Delta_2}^2(n)$ may be related to a frequency domain spacing between the frequency domain resources respectively occupied by $\Delta_1$ and $\Delta_2$.

Optionally, the phase difference φ satisfies the following relationship:

$\varphi=2\pi\Delta k$ or $\varphi=-2\pi\Delta k$, where

Δk is a frequency domain spacing between frequency domain resources occupied by $S_{\Delta_1}(n)$ and $S_{\Delta_j}(n)$).

For example, in FIG. 7, the phase difference between $S_{\Delta_1}(n)$ and $S_{\Delta_2}^1(n)$ or $S_{\Delta_2}^2(n)$ is numerically 2π times a frequency domain spacing between the frequency domain resources respectively occupied by $\Delta_1$ and $\Delta_2$.

Optionally, when the signal sequences separately mapped within one OFDM symbol from the first signals corresponding to the subcarrier spacing system parameter $\Delta_i$ and the subcarrier spacing system parameter $\Delta_j$ in the subcarrier spacing system parameter group $\{\Delta_i\}$, 0<i≤I differ by one phase, the phase difference φ is related to lengths of CPs respectively corresponding to the subcarrier spacing system parameter $\Delta_i$ and the subcarrier spacing system parameter $\Delta_j$ and the frequency domain locations occupied by the first signals corresponding to the subcarrier spacing system parameter $\Delta_i$ and the subcarrier spacing system parameter $\Delta_j$.

For example, in FIG. 7, the phase difference between $S_{\Delta_1}(n)$ and $S_{\Delta_2}^1(n)$ or $S_{\Delta_2}^2(n)$ may be related to both a frequency domain spacing between frequency domain resources respectively occupied by $\Delta_1$ and $\Delta_2$ and the lengths of the CPs respectively corresponding to $\Delta_1$ and $\Delta_2$.

Optionally, consecutive signals of the second signals respectively corresponding to the different subcarrier spacing system parameters in the subcarrier spacing system parameter group $\{\Delta_i\}$, 0<i≤I within the occupied time length T are the same; or consecutive signals of the second signals respectively corresponding to the different subcarrier spacing system parameters in the subcarrier spacing system parameter group $\{\Delta_i\}$, 0<i≤I within the occupied time length T differ by one cyclic shift or one phase.

Figure 8:
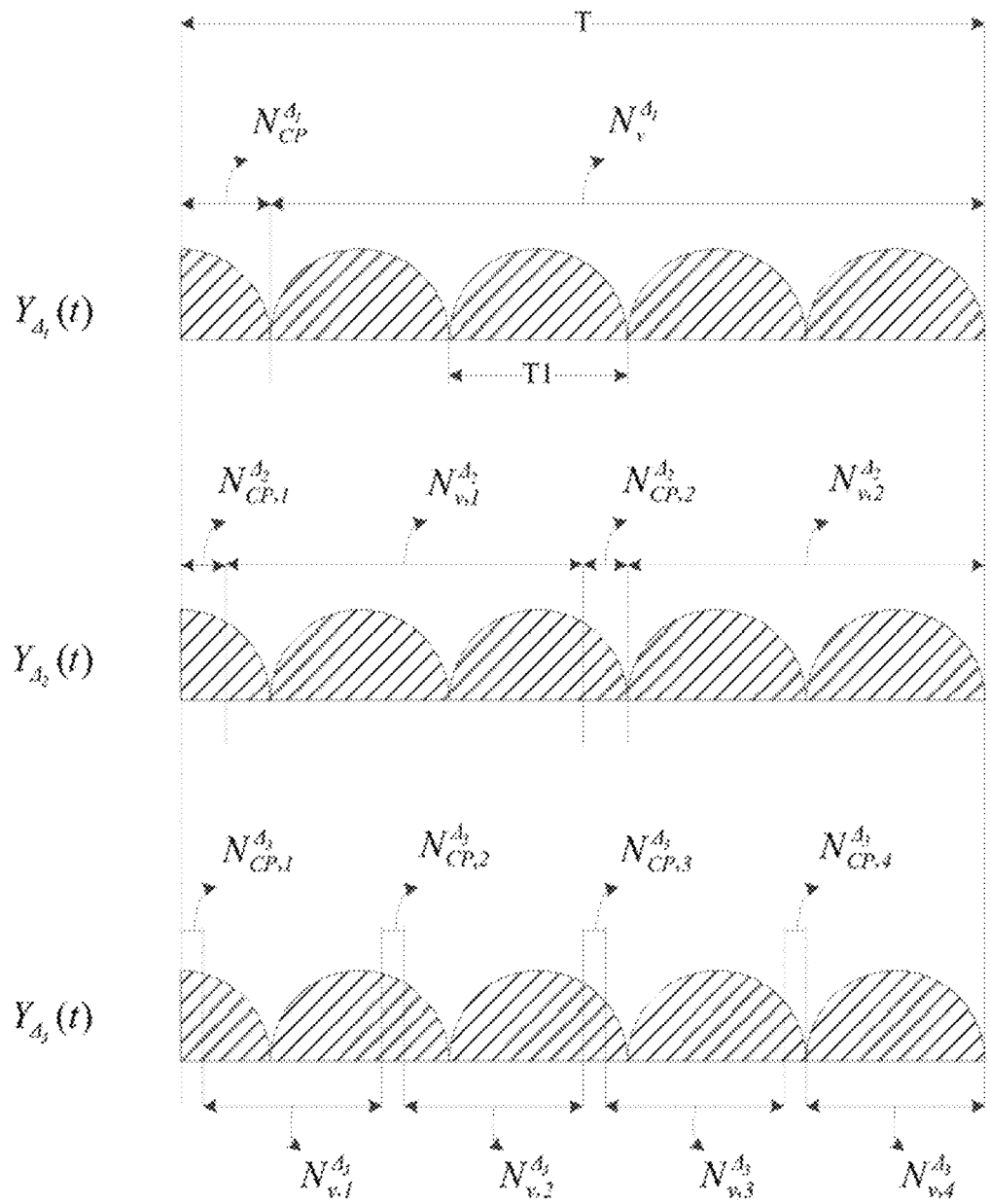
FIG. 8 is a schematic diagram of comparison between second signals in the embodiment shown in FIG. 4.

For example, FIG. 8 is a schematic diagram of comparison between second signals in this embodiment of this application. In FIG. 8, the subcarrier spacing system parameter group $\{\Delta_i\}$ includes three subcarrier spacing system parameters, namely $\Delta_1$, $\Delta_2$, and $\Delta_3$, and $\Delta_3=2\Delta_2=4\Delta_1$. Second signals corresponding to the subcarrier spacing system parameters $\Delta_1$, $\Delta_2$ and $\Delta_3$ occupy a same time length T.

In FIG. 8, $N_{CP}^{\Delta_1}$ is a length of a cyclic prefix in a second signal corresponding to $\Delta_1$. The length herein is a consecutive time length. $N_{CP,1}^{\Delta_2}$ and $N_{CP,2}^{\Delta_2}$ are respectively lengths of the first and the second cyclic prefixes in a second signal corresponding to $\Delta_2$, $N_{CP,1}^{\Delta_3}$, $N_{CP,2}^{\Delta_3}$, $N_{CP,3}^{\Delta_3}$, and $N_{CP,3}^{\Delta_3}$ are respectively lengths of the first to the fourth cyclic prefixes in a second signal corresponding to $\Delta_3$.

In addition, in FIG. 8, $N_V^{\Delta_3}$ is a length of an effective OFDM symbol in the second signal corresponding to $\Delta_1$, $N_{V,1}^{\Delta_2}$ and $N_{V,2}^{\Delta_2}$ are respectively lengths of the first and the second effective OFDM symbols in the second signal corresponding to $\Delta_2$, and $N_{V,1}^{\Delta_3}$, $N_{V,2}^{\Delta_3}$, $N_{V,3}^{\Delta_3}$, and $N_{V,4}^{\Delta_3}$ are respectively lengths of the first to the fourth effective OFDM symbols in the second signal corresponding to $\Delta_3$.

Optionally, when consecutive signals of second signals respectively corresponding to a subcarrier spacing system parameter $\Delta_i$ and a subcarrier spacing system parameter $\Delta_j$ in the subcarrier spacing system parameter group $\{\Delta_i\}$, 0<i≤I within the occupied time length T differ by one phase, the following condition is satisfied:

$Y_{\Delta_i}(t)=Y_{\Delta_j}(t)e^{j\varphi}$, where $Y_{\Delta_i}(t)$ is the consecutive signals of the second signal corresponding to the subcarrier spacing system parameter $\Delta_i$ within the occupied time length T, $Y_{\Delta_j}(t)$ is the consecutive signals of the second signal corresponding to the subcarrier spacing system parameter $\Delta_j$ within the occupied time length T, and φ is a phase difference between $Y_{\Delta_i}(t)$ and $Y_{\Delta_j}(t)$.

For example, in FIG. 8, there may be a phase difference between the second signal $Y_{\Delta_1}(t)$ corresponding to $\Delta_1$, the second signal $Y_{\Delta 2}(t)$ corresponding to $\Delta_2$, and the second signal $Y_{\Delta 3}(t)$ corresponding to $\Delta_3$.

Optionally, when consecutive signals of second signals respectively corresponding to a subcarrier spacing system parameter $\Delta_i$ and a subcarrier spacing system parameter $\Delta_j$ in the subcarrier spacing system parameter group $\{\Delta_i\}$, $0<i\leq I$ within the occupied time length T differ by one cyclic shift, the following condition is satisfied:

$$Y_{\Delta_i}(t)=Y_{\Delta_j}(t+m), \text{ where}$$

$Y_{\Delta_i}(t)$ is the consecutive signals of the second signal corresponding to the subcarrier spacing system parameter $\Delta_i$ within the occupied time length T, $Y_{\Delta_j}(t+m)$ is consecutive signals obtained after cyclically shifting the second signal corresponding to the subcarrier spacing system parameter $\Delta_j$ within the occupied time length T by m.

For example, in FIG. 8, any two of the second signal $Y_{\Delta_1}(t)$ corresponding to $\Delta_1$, the second signal $Y_{\Delta_1}(t)$ corresponding to $\Delta_2$, and the second signal $Y_{\Delta_j}(t)$ corresponding to $\Delta_3$ satisfy a relationship of a cyclic shift. For example, $Y_{\Delta_1}(t)$ may be obtained by cyclically shifting $Y_{\Delta 2}(t)$ by $m_1$, or $Y_{\Delta 2}(t)$ may be obtained by cyclically shifting $Y_{\Delta 3}(t)$ by $m_1$.

Optionally, the consecutive signals of the second signals respectively corresponding to the different subcarrier spacing system parameters in the subcarrier spacing system parameter group $\{\Delta_i\}$, $0<i\leq I$ within the occupied time length T are periodically repeated.

For example, in FIG. 8, a second signal corresponding to each subcarrier spacing system parameter is periodically repeated within the occupied time length T.

Optionally, an integer quantity of times that the consecutive signals of the second signals respectively corresponding to the different subcarrier spacing system parameters within the occupied time length T are periodically repeated is R; and $$R = \frac{\max(\Delta_i)}{\min(\Delta_i)},$$

where $\min(\Delta_i)$ is a minimum subcarrier spacing system parameter in the subcarrier spacing system parameter group $\{\Delta_i\}$, $0<i\leq I$, and is a maximum subcarrier spacing system parameter in the subcarrier spacing system parameter group $\{\Delta_i\}$, $0<i\leq I$.

For example, in FIG. 8, the subcarrier spacing system parameter group $\{\Delta_i\}$ includes three subcarrier spacing system parameters, namely, $\Delta_1$, $\Delta_2$, and $\Delta_3$, and $\Delta_3=2\Delta_2=4\Delta_1$. In this case, $$R = \frac{\Delta_3}{\Delta_1} = 4.$$

To be specific, the second signal corresponding to each subcarrier spacing system parameter is periodically repeated four times within the occupied time length T.

Optionally, a length of a minimum period within which the consecutive signals of the second signals respectively corresponding to the different subcarrier spacing system parameters within the occupied time length T are repeated is a length of an OFDM symbol corresponding to the maximum subcarrier spacing system parameter in the subcarrier spacing system parameter group $\{\Delta_i\}$, $0<i\leq I$.

For example, in FIG. 8, the second signal corresponding to each subcarrier spacing system parameter within the occupied time length T is periodically repeated four times. A length of a minimum period is a length of an OFDM symbol corresponding to $\Delta_3$. As shown in FIG. 8, the length of the minimum period is a length of a cyclic prefix plus a length of an effective OFDM symbol.

Optionally, a length of a minimum period within which the consecutive signals of the second signals respectively corresponding to the different subcarrier spacing system parameters within the occupied time length T are repeated is 1/R of a length of an OFDM symbol corresponding to the minimum subcarrier spacing system parameter in the subcarrier spacing system parameter group $\{\Delta_i\}$, $0<i\leq I$.

For example, in FIG. 8, the second signal corresponding to $\Delta_1$ occupies one OFDM symbol, and the second signal corresponding to each subcarrier spacing system parameter is periodically repeated four times within the occupied time length T. In this case, the length of the minimum period within which the consecutive signals of the second signals respectively corresponding to the different subcarrier spacing system parameters within the occupied time length T are repeated is 1/R of a length of an OFDM symbol corresponding to $\Delta_1$.

Optionally, a quantity of times that the second signal corresponding to the subcarrier spacing system parameter $\Delta_i$ in the subcarrier spacing system parameter group $\{\Delta_i\}$, $0<i\leq I$ is repeated within one OFDM symbol is $m_{\Delta_i}$; and $$M_{\Delta_i} = \frac{\max(\Delta_i)}{\Delta_i},$$

where $\max(\Delta_i)$ is the maximum subcarrier spacing system parameter in the subcarrier spacing system parameter group $\{\Delta_i\}$, $0<i\leq I$.

For example, in FIG. 8, the second signal corresponding to $\Delta_1$ within the time length T occupies one OFDM symbol, and is periodically repeated four times within the time length T. That is, the second signal corresponding to $\Delta_1$ is periodically repeated four times within one OFDM symbol. The second signal corresponding to $\Delta_2$ within the time length T occupies two OFDM symbols, and is periodically repeated four times within the time length T. That is, the second signal corresponding to $\Delta_2$ is periodically repeated twice within one OFDM symbol. The second signal corresponding to $\Delta_3$ within the time length T occupies four OFDM symbols, and is periodically repeated four times within the time length T. That is, the second signal corresponding to $\Delta_3$ is periodically repeated once within one OFDM symbol.

Optionally, second signals respectively corresponding to the $N_{\Delta_i}$ OFDM symbols occupied by the first signal corresponding to the subcarrier spacing system parameter $\Delta_i$ in the subcarrier spacing system parameter group $\{\Delta_i\}$, $0<i\leq I$ differ by one cyclic shift.

The cyclic shift between the second signals respectively corresponding to the $N_{\Delta_i}$ OFDM symbols occupied by the first signal corresponding to the subcarrier spacing system parameter $\Delta_i$ is related to the cyclic prefix corresponding to $\Delta_i$.

For example, in FIG. 8, in the second signal corresponding to $\Delta_2$, consecutive signals in $N_{CP,1}{}^{\Delta_2}$ and $N_{V,1}{}^{\Delta_2}$ and consecutive signals in $N_{CP,2}{}^{\Delta_2}$ and $N_{V,2}{}^{\Delta_2}$ differ by one cyclic shift, the cyclic shift is related to the cyclic prefix corresponding to $\Delta_2$. Similarly, in the second signal corresponding to $\Delta_3$, consecutive signals between any two OFDM symbols also differ by one cyclic shift, and the cyclic shift is related to the cyclic prefix corresponding to $\Delta_3$.

Optionally, $N_{\Delta_i}$ effective OFDM symbols included in the second signal corresponding to the subcarrier spacing system parameter $\Delta_i$ in the subcarrier spacing system parameter group $\{\Delta_i\}$, $0 \le i \le I$ satisfy the following condition:

$$Z_{\Delta_i}^P(n) = Z_{\Delta_j}^P(n + m_{\Delta_i}^P), 0 \le n < L; \text{ and}$$

$$m_{\Delta_i}^P = N_{CP}^{\Delta_j} - \Sigma_{r=0}^{r=P} N_{CP,r}^{\Delta_i} \text{ or } m_{\Delta_i}^P = -(N_{CP}^{\Delta_j} - \Sigma_{r=0}^{r=P} N_{CP,r}^{\Delta_i}), \text{ where}$$

$Z_{\Delta_i}^P(n)$ is consecutive signals within the $p^{th}$ period that uses an effective symbol length of $\Delta_i$ as the minimum period and that are in the second signal corresponding to the subcarrier spacing system parameter $\Delta_i$, and $0 \le p < N_{\Delta_i}$.

$Z_{\Delta_j}^P(n)$ is consecutive signals within the $p^{th}$ period that correspond to the effective OFDM symbols and that are in the second signal corresponding to the subcarrier spacing system parameter $\Delta_j$ in the subcarrier spacing system parameter group $\{\Delta_i\}$, $0 \le i \le I$;

$N_{CP}^{\Delta_j}$ is the length of the CP corresponding to the subcarrier spacing system parameter $\Delta_j$; and $N_{CP,r}^{\Delta_i}$ is a length of a CP of the $r^{th}$ OFDM symbol corresponding to the subcarrier spacing system parameter $\Delta_i$.

For example, in FIG. 8, $\Delta_1$ is the minimum subcarrier spacing system parameter in the subcarrier spacing system parameter group, a phase difference between a signal within the second period (T1 in FIG. 8) that uses an effective symbol length of $\Delta_3$ as a minimum period in the second signal corresponding to $\Delta_1$ and a signal within the second period ($N_{CP,2}^{\Delta_3}$ in FIG. 8) that uses the effective symbol length of $\Delta_3$ as a minimum period in $\Delta_3$ is numerically equal to a difference obtained by subtracting a sum of lengths of first two CPs corresponding to $\Delta_3$ from a length of a CP corresponding to $\Delta_1$.

Optionally, the first signal or the second signal corresponds to at least one of a downlink synchronization signal, a downlink measurement pilot reference signal, an uplink random access channel RACH signal, and an uplink channel sounding reference signal SRS. The downlink synchronization signal includes a primary synchronization signal, or the downlink synchronization signal includes a primary synchronization signal and a secondary synchronization signal.

In this embodiment of this application, the first signal or the second signal satisfying the foregoing condition may be a downlink synchronization signal, a downlink measurement pilot reference signal, an uplink random access channel RACH signal, or an uplink channel sounding reference signal SRS in the wireless system.

For example, when the first network device is a wireless access device, and the second network device is a terminal, the first signal or the second signal corresponds to a downlink synchronization signal or a downlink measurement pilot reference signal. When the first network device is a terminal, and the second network device is a wireless access device, the first signal or the second signal corresponds to an uplink random access channel RACH signal or an uplink channel sounding reference signal SRS.

Optionally, signals corresponding to the different subcarrier spacing system parameters included in the subcarrier spacing system parameter group $\{\Delta_i\}$, $0 \le i \le I$ are transmitted in a time division multiplexing or frequency division multiplexing manner.

As shown in FIG. 2, time division multiplexing is used for the signals corresponding to the different subcarrier spacing system parameters. For example, in a period of time after a moment t1, a subcarrier spacing system parameter 1 is used to send/receive a signal on a frequency band 1. In a period of time after a moment t2, a subcarrier spacing system parameter 2 is used to send/receive a signal on a frequency band 2.

Alternatively, frequency division multiplexing is used for the signals corresponding to the different subcarrier spacing system parameters. For example, in a period of time after a moment t1, a subcarrier spacing system parameter 1 is used to send/receive a signal on a frequency band 1, a subcarrier spacing system parameter 2 is used to send/receive a signal on a frequency band 2, and a subcarrier spacing system parameter 3 is used to send/receive a signal on a frequency band 3.

Optionally, a frequency division multiplexing manner is used for the first signal and a data channel that correspond to the subcarrier spacing system parameter $\Delta_i$ in the subcarrier spacing system parameter group $\{\Delta_i\}$, $0 \le i \le I$, and an OFDM symbol corresponding to data carried in the data channel is generated based on the subcarrier spacing system parameter $\Delta_i$.

Figure 9:
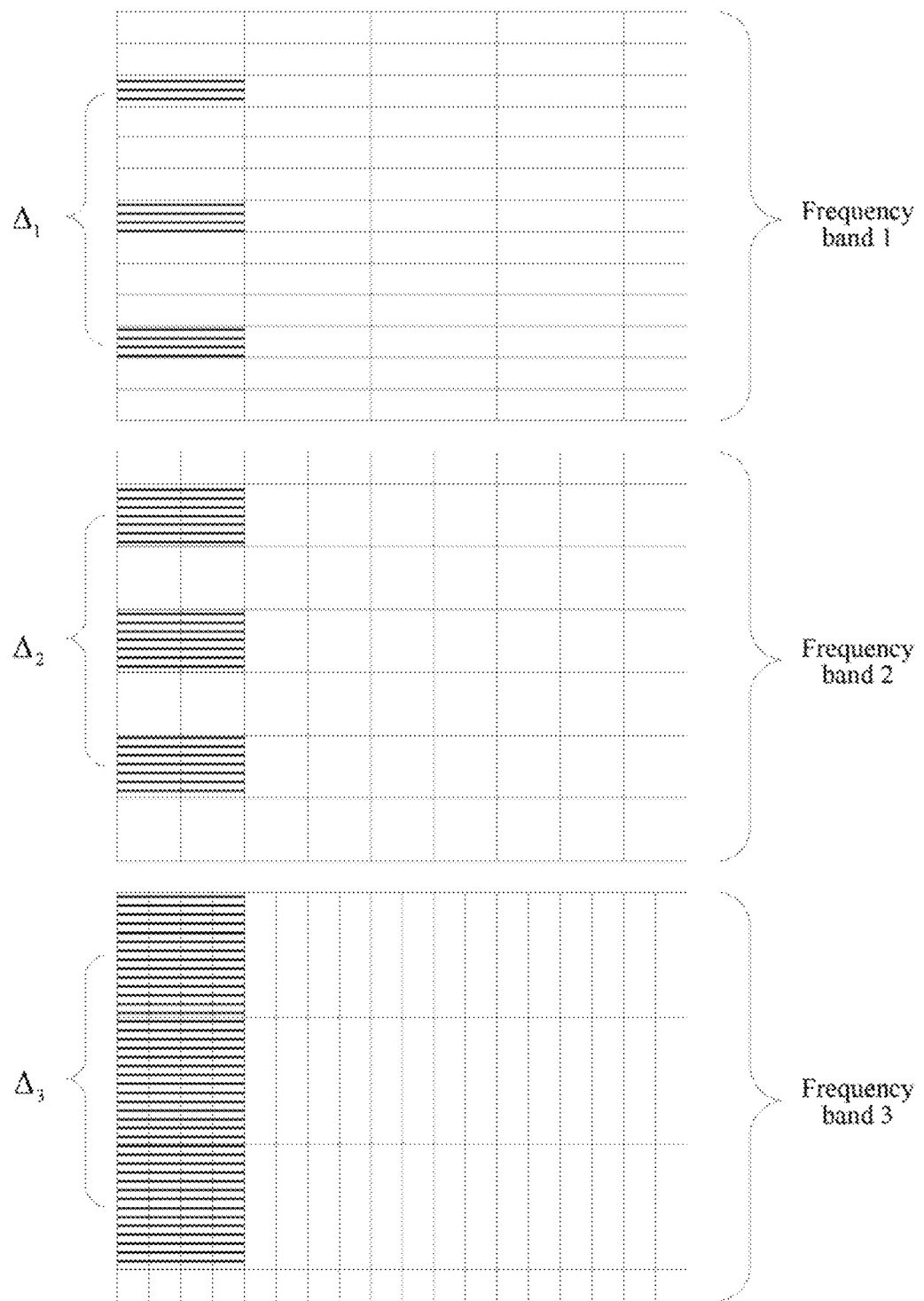
FIG. 9 is a schematic diagram of resource mapping in the embodiment shown in FIG. 4.

For example, FIG. 9 is a schematic diagram of resource mapping in this embodiment of this application. In FIG. 9, the subcarrier spacing system parameter $\{\Delta_i\}$ group includes three subcarrier spacing system parameters, namely, $\Delta_1$, $\Delta_2$, and $\Delta_3$, and $\Delta_3 = 2\Delta_2 = 4\Delta_1$. First signals corresponding to $\Delta_1$, $\Delta_2$, and $\Delta_3$ are mapped on some frequency domain resources on frequency bands respectively corresponding to $\Delta_1$, $\Delta_2$, and $\Delta_3$. Other frequency domain resources on the frequency bands respectively corresponding to $\Delta_1$, $\Delta_2$, and $\Delta_3$ are used to map a signal corresponding to the data channel. In addition, OFDM symbols corresponding to the data channel may be generated based on the respective corresponding subcarrier spacing system parameters, and do not need to satisfy a condition of a corresponding first signal or second signal.

This step may be implemented by the processor 31 in FIG. 3 executing the signal generation module 33*a*1.

Step 402. A second network device maps, onto a time frequency resource, a first signal that is in frequency domain and that corresponds to a subcarrier spacing parameter in a subcarrier spacing system parameter group $\{\Delta_i\}$, $0 \le i \le I$, and generates a second signal that is in time domain and that corresponds to the first signal.

In this embodiment of this application, the second network device also generates the second signal in the second network device by using the method used by the first network device to generate the second signal. For the step of generating the second signal by the second network device and the condition that needs to be satisfied by the first signal and the second signal, refer to the descriptions in step 401, and details are not described herein again.

This step may be implemented by the processor 31 in FIG. 3 executing the signal generation module 33*a*1.

Step 403. The first network device sends the generated second signal to the second network device, and the second network device receives the signal sent by the first network device.

The step of sending the generated second signal by the first network device to the second network device may be implemented by the processor 31 in FIG. 3 executing the signal sending module 33*a*2.

The step of receiving, by the second network device, the signal sent by the first network device may be implemented by the processor 31 in FIG. 3 executing the signal receiving module 33*a*3.

Step 404. The second network device performs signal detection on the received signal based on the generated second signal.

The second network device may perform, based on the generated second signal, a signal detection operation such as synchronization signal detection or channel quality detection on the received signal.

After receiving the signal sent by the first network device, the second network device may match the locally generated second signal with the received signal, to detect whether the received signal includes the second signal. In a case of the different subcarrier spacing system parameters, because first signals on a side of the first network device and a side of the second network device occupy a same quantity of subcarriers in frequency domain, and the generated second signals occupy a same time length in time domain, when the second network device detects the second signal, impact of a quantity of subcarriers and a time domain length corresponding to signals sent in the case of the different subcarrier spacing system parameters may be ignored.

In conclusion, according to the signal sending method provided in this embodiment of this application, when a signal is sent, at a same moment, specified signals sent based on different subcarrier spacing system parameters occupy a same quantity of subcarriers in frequency domain and occupy a same time length in time domain. When the second network device receives the signal, regardless of which type of subcarrier spacing system parameter that the first network device uses to send the signal, the specified signals included in the signal received by the second network device occupy the same quantity of subcarriers in frequency domain and occupy the same time length in time domain. In this way, when the second network device detects a specified signal in the signal sent by the first network device, impact of the quantity of subcarriers and the time domain length corresponding to the different subcarrier spacing system parameters may be ignored, thereby simplifying complexity of detecting the specified signal by the second network device, and improving communication efficiency of a wireless system.

Figure 10:
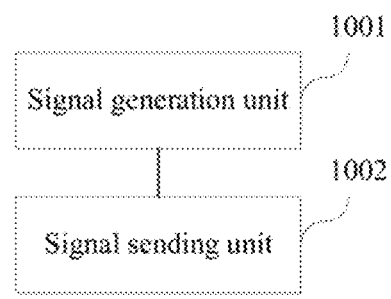
FIG. 10 is a block diagram of a signal sending apparatus according to an embodiment of this application.

FIG. 10 is a block diagram of a signal sending apparatus according to an embodiment of this application. The apparatus may be implemented by hardware or a combination of software and hardware as some or all of the first network device 110 in the network environment shown in FIG. 1, and configured to perform all or some steps performed by the first network device in FIG. 4. The apparatus may include a signal generation unit 1001 and a signal sending unit 1002.

In this embodiment, the apparatus is presented in a form of a functional unit. The "unit" herein may refer to an application-specific integrated circuit (application-specific integrated circuit, ASIC), a circuit, a processor and a memory that execute one or more software or firmware programs, an integrated logical circuit, and/or another device that can provide the foregoing functions.

The signal generation unit 1001 is configured to implement step 401 in FIG. 4, to be specific, map, onto a time frequency resource, a first signal that is in frequency domain and that corresponds to a subcarrier spacing parameter in a subcarrier spacing system parameter group $\{\Delta_i\}$, $0<i\leq I$, and generate a second signal that is in time domain and that corresponds to the first signal, where the second signal is an OFDM symbol in time domain, the OFDM symbol includes an effective OFDM symbol and a cyclic prefix of the effective OFDM symbol, I is a quantity of subcarrier spacing system parameters in the subcarrier spacing system parameter group $\{\Delta_i\}$, $0<i\leq I$, I is an integer greater than or equal to 2, any two subcarrier spacing system parameters in the subcarrier spacing system parameter group $\{\Delta_i\}$, $0<i\leq I$ satisfy a multiple relationship of $2^c$, and c is an integer greater than 1.

The signal sending unit 1102 is configured to implement a part performed by the first network device in step 403 in FIG. 4, to be specific, send the second signal to a second network device.

First signals and second signals respectively corresponding to different subcarrier spacing system parameters in the subcarrier spacing system parameter group $\{\Delta_i\}$, $0<i\leq I$ have the following characteristics:

the first signals corresponding to the different subcarrier spacing system parameters occupy a same quantity of subcarriers; and the second signals corresponding to the different subcarrier spacing system parameters occupy a same time length T.

For other characteristics of the first signals and the second signals respectively corresponding to the different subcarrier spacing system parameters, refer to the descriptions in the embodiment shown in FIG. 4, and details are not described herein again.

The signal generation unit 1001 has a function the same or similar to that of the signal generation module 33a1, and the signal sending unit 1002 has a function the same or similar to that of the signal sending module 33a2.

Figure 11:
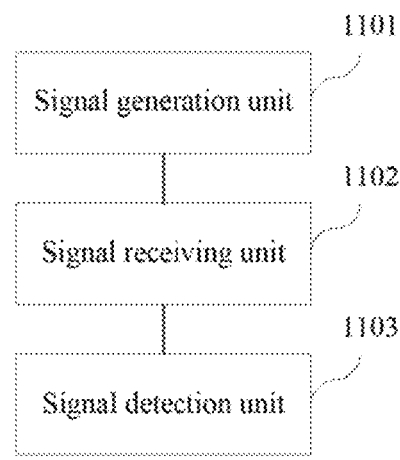
FIG. 11 is a block diagram of a signal detection apparatus according to an embodiment of this application.

FIG. 11 is a block diagram of a signal detection apparatus according to an embodiment of this application. The apparatus may be implemented by hardware or a combination of software and hardware as some or all of the second network device 120 in the network environment shown in FIG. 1, and configured to perform all or some steps performed by the second network device in FIG. 4. The apparatus may include a signal generation unit 1101, a signal receiving unit 1102, and a signal detection unit 1103.

In this embodiment, the apparatus is presented in a form of a functional unit. The "unit" herein may refer to an application-specific integrated circuit (application-specific integrated circuit, ASIC), a circuit, a processor and a memory that execute one or more software or firmware programs, an integrated logical circuit, and/or another device that can provide the foregoing functions.

The signal generation unit 1101 is configured to implement step 402 in FIG. 4, to be specific, map, onto a time frequency resource, a first signal that is in frequency domain and that corresponds to a subcarrier spacing parameter in a subcarrier spacing system parameter group $\{\Delta_i\}$, $0<i\leq I$, and generate a second signal that is in time domain and that corresponds to the first signal, where the second signal is an OFDM symbol in time domain, the OFDM symbol includes an effective OFDM symbol and a cyclic prefix of the effective OFDM symbol, I is a quantity of subcarrier spacing system parameters in the subcarrier spacing system parameter group $\{\Delta_i\}$, $0<i\leq I$, I is an integer greater than or equal to 2, any two subcarrier spacing system parameters in the subcarrier spacing system parameter group $\{\Delta_i\}$, $0<i\leq I$ satisfy a multiple relationship of $2^c$, and c is an integer greater than 1.

The signal receiving unit 1102 is configured to implement a part performed by the second network device in step 403 in FIG. 4, to be specific, receive the signal sent by the first network device.

The signal detection unit 1103 is configured to implement step 404 in FIG. 4, to be specific, perform signal detection on the received signal based on the generated second signal.

First signals and second signals respectively corresponding to different subcarrier spacing system parameters in the subcarrier spacing system parameter group $\{\Delta_i\}$, 0<i≤I have the following characteristics:

the first signals corresponding to the different subcarrier spacing system parameters occupy a same quantity of subcarriers; and the second signals corresponding to the different subcarrier spacing system parameters occupy a same time length T.

For other characteristics of the first signals and the second signals respectively corresponding to the different subcarrier spacing system parameters, refer to the descriptions in the embodiment shown in FIG. 4, and details are not described herein again.

The signal generation unit 1101 has a function the same or similar to that of the signal generation module 33a1, the signal receiving unit 1102 has a function the same or similar to that of the signal receiving module 33a3, and the signal detection unit 1103 has a function the same or similar to that of the signal detection module 33a4.

A person of ordinary skill in the art may understand that all or some of the steps of the embodiments may be implemented by hardware or by a program instructing related hardware. The program may be stored in a computer-readable storage medium.

The foregoing descriptions are merely example embodiments of this application, but are not intended to limit this application. Any modification, equivalent replacement, or improvement made without departing from the spirit and principle of this application should fall within the protection scope of this application.

What is claimed is:

1. A first network device, comprising:
a processor; and
a memory having processor-executable instructions stored thereon;
wherein the processor is configured to execute the processor-executable instructions to facilitate:
mapping, onto a time frequency resource, a first signal that is in frequency domain and that corresponds to a subcarrier spacing system parameter in a subcarrier spacing system parameter group $\{\Delta_i\}$, wherein the subcarrier spacing system parameter group comprises subcarrier spacing system parameters $\Delta_i$, where i is an integer greater than 0 and less than or equal to I, I is a quantity of subcarrier spacing system parameters in the subcarrier spacing system parameter group $\{\Delta_i\}$, and I is an integer greater than or equal to 2, and wherein any two subcarrier spacing system parameters in the subcarrier spacing system parameter group $\{\Delta_i\}$ satisfy a multiple relationship of $2^c$, where c is an integer greater than 1;
generating a second signal that is in time domain and that corresponds to the first signal, wherein the second signal is an orthogonal frequency division multiplexing (OFDM) symbol in time domain, and the OFDM symbol comprises an effective OFDM symbol and a cyclic prefix of the effective OFDM symbol; and
sending the second signal to a second network device;
wherein first signals and second signals respectively corresponding to different subcarrier spacing system parameters in the subcarrier spacing system parameter group $\{\Delta_i\}$ have the following characteristics:
the first signals corresponding to the different subcarrier spacing system parameters occupy a same quantity of subcarriers; and
the second signals corresponding to the different subcarrier spacing system parameters occupy a same time length T.

2. The first network device according to claim 1, wherein any two adjacent frequency domain resources mapped within a same OFDM symbol from the first signal have a same frequency domain spacing Δf; and
wherein the first signals corresponding to the different subcarrier spacing system parameters correspond to the same Δf.

3. The first network device according to claim 2, wherein Δf is equal to max($\Delta_i$), and max($\Delta_i$) is a maximum subcarrier spacing system parameter in the subcarrier spacing system parameter group $\{\Delta_i\}$.

4. The first network device according to claim 1, wherein a frequency domain spacing between any two adjacent frequency domain resources mapped within a same OFDM symbol from the first signal corresponds to a same quantity $M_{\Delta_i}$ of subcarriers, wherein $$M_{\Delta_i} = \frac{\max(\Delta_i)}{\Delta_i},$$

wherein max($\Delta_i$) is a maximum subcarrier spacing system parameter in the subcarrier spacing system parameter group $\{\Delta_i\}$.

5. The first network device according to claim 4, wherein data mapped on $M_{\Delta_i}-1$ subcarriers spaced by the adjacent frequency domain resources mapped within the same OFDM symbol from the first signal is 0.

6. The first network device according to claim 4, wherein an index of a subcarrier mapped within the same OFDM symbol from the first signal satisfies $M_{\Delta_i}*k$, wherein k is an integer.

7. The first network device according to claim 1, wherein the first signal or the second signal comprises $N_{\Delta_i}$ consecutive OFDM symbols, wherein $$N_{\Delta_i} = \frac{\Delta_i}{\min(\Delta_i)},$$

wherein min($\Delta_i$) is a minimum subcarrier spacing system parameter in the subcarrier spacing system parameter group $\{\Delta_i\}$.

8. The first network device according to claim 1, wherein:
signal sequences respectively mapped within one OFDM symbol from the first signals corresponding to the different subcarrier spacing system parameters in the subcarrier spacing system parameter group $\{\Delta_i\}$ are exactly the same; or
signal sequences respectively mapped within one OFDM symbol from the first signals corresponding to the different subcarrier spacing system parameters in the subcarrier spacing system parameter group $\{\Delta_i\}$ differ by one phase.

9. The first network device according to claim 1, wherein $N_{\Delta_i}$ sequences mapped within $N_{\Delta_i}$ OFDM symbols occupied by the first signal differ by one phase.

10. The first network device according to claim 9, wherein a phase difference between the $N_{\Delta_i}$ sequences mapped within the $N_{\Delta_i}$ OFDM symbols occupied by the first signal is related to a length of a cyclic prefix corresponding to the subcarrier spacing system parameter.

11. A signal sending method, wherein the method comprises:
mapping, by a first network device onto a time frequency resource, a first signal that is in frequency domain and that corresponds to a subcarrier spacing system parameter in a subcarrier spacing system parameter group $\{\Delta_i\}$, wherein the subcarrier spacing system parameter group comprises subcarrier spacing system parameters $\Delta_i$, where i is an integer greater than 0 and less than or equal to I, I is a quantity of subcarrier spacing system parameters in the subcarrier spacing system parameter group $\{\Delta_i\}$, and I is an integer greater than or equal to 2, and wherein any two subcarrier spacing system parameters in the subcarrier spacing system parameter group $\{\Delta_i\}$ satisfy a multiple relationship of $2^c$, where c is an integer greater than 1;
generating, by the first network device, a second signal that is in time domain and that corresponds to the first signal, wherein the second signal is an orthogonal frequency division multiplexing (OFDM) symbol in time domain, and the OFDM symbol comprises an effective OFDM symbol and a cyclic prefix of the effective OFDM symbol; and
sending, by the first network device, the second signal to a second network device;
wherein first signals and second signals respectively corresponding to different subcarrier spacing system parameters in the subcarrier spacing system parameter group $\{\Delta_i\}$ have the following characteristics:
the first signals corresponding to the different subcarrier spacing system parameters occupy a same quantity of subcarriers; and
the second signals corresponding to the different subcarrier spacing system parameters occupy a same time length T.

12. The method according to claim 11, wherein any two adjacent frequency domain resources mapped within a same OFDM symbol from the first signal have a same frequency domain spacing $\Delta f$, and
the first signals corresponding to the different subcarrier spacing system parameters correspond to the same $\Delta f$.

13. The method according to claim 11, wherein a frequency domain spacing between any two adjacent frequency domain resources mapped within a same OFDM symbol from the first signal corresponds to a same quantity $M_{\Delta_i}$ of subcarriers, wherein $$M_{\Delta_i} = \frac{\max(\Delta_i)}{\Delta_i},$$

wherein $\max(\Delta_i)$ is a maximum subcarrier spacing system parameter in the subcarrier spacing system parameter group $\{\Delta_i\}$.

14. The method according to claim 13, wherein data mapped on $M_{\Delta_i}-1$ subcarriers spaced by the adjacent frequency domain resources mapped within the same OFDM symbol from the first signal is 0.

15. The method according to claim 13, wherein an index of a subcarrier mapped within the same OFDM symbol from the first signal satisfies $M_{\Delta_i}*k$, wherein k is an integer.

16. The method according to claim 11, wherein the first signal or the second signal comprises $N_{\Delta_i}$ A consecutive OFDM symbols, wherein $$N_{\Delta_i} = \frac{\Delta_i}{\min(\Delta_i)},$$

wherein $\min(\Delta_i)$ is a minimum subcarrier spacing system parameter in the subcarrier spacing system parameter group $\{\Delta_i\}$.

17. The method according to claim 11, wherein:
signal sequences respectively mapped within one OFDM symbol from the first signals corresponding to the different subcarrier spacing system parameters in the subcarrier spacing system parameter group $\{\Delta_i\}$ are exactly the same; or
signal sequences respectively mapped within one OFDM symbol from the first signals corresponding to the different subcarrier spacing system parameters in the subcarrier spacing system parameter group $\{\Delta_i\}$ differ by one phase.

18. The method according to claim 11, wherein $N_{\Delta_i}$ sequences mapped within $N_{\Delta_i}$ OFDM symbols occupied by the first signal differ by one phase.

19. The method according to claim 18, wherein a phase difference between the $N_{\Delta_i}$ sequences mapped within the $N_{\Delta_i}$ OFDM symbols occupied by the first signal is related to a length of a cyclic prefix corresponding to the subcarrier spacing system parameter.

20. The method according to claim 11, wherein signal sequences respectively mapped within one OFDM symbol from the first signals corresponding to the different subcarrier spacing system parameters in the subcarrier spacing system parameter group $\{\Delta_i\}$ differ by one phase; and
wherein the following condition is satisfied:

$$S_{\Delta_i}(n) = S_{\Delta_j}(n) e^{j\varphi k(n)}, 0 \leq n \leq L,$$

wherein L is a sequence length of a first signal, $\varphi$ is a phase difference between the signal sequences $S_{\Delta_i}(n)$ and $S_{\Delta_j}(n)$ are respective sequences of the first signals within the OFDM symbol, k(n) is a frequency of a subcarrier occupied by the $n^{th}$ sequence symbol in $S_{\Delta_i}(n)$, and n represents an index of a respective sequence symbol.

* * * * *

UNITED STATES PATENT AND TRADEMARK OFFICE
CERTIFICATE OF CORRECTION

PATENT NO. : 10,911,285 B2
APPLICATION NO. : 16/270308
DATED : February 2, 2021
INVENTOR(S) : Liu It is certified that error appears in the above-identified patent and that said Letters Patent is hereby corrected as shown below:

On the Title Page

Page 2, Foreign Patent Document Citation No. 6: "CN 103856308 6/2014" should read -- CN103856308 A 6/2014 --.

Page 2, Other Publications Citation No. 2: "total 3 pp. 111" should read -- total 3 pages --.

Signed and Sealed this
Twenty-sixth Day of September, 2023

Katherine Kelly Vidal
*Director of the United States Patent and Trademark Office*